United States Patent
Downie et al.

(10) Patent No.: US 11,826,722 B2
(45) Date of Patent: Nov. 28, 2023

(54) BIOREFINING METHOD

(71) Applicants: Licella Pty Ltd, Somersby (AU); Licella Fibre Fuels Pty Ltd, Somersby (AU); Ignite Resources Pty Ltd, North Sydney (AU)

(72) Inventors: Robert Downie, Laguna (AU); Leonard James Humphreys, Roseville Chase (AU); Thomas Maschmeyer, Lindfield (AU); William Rowlands, Alexandria (AU)

(73) Assignees: Licella Pty Ltd, Somersby (AU); Licella Fibre Fuels Pty Ltd, Somersby (AU); Ignite Resources Pty Ltd, North Sydney (AU)

( * ) Notice: Subject to any disclaimer, the term of this patent is extended or adjusted under 35 U.S.C. 154(b) by 0 days.

(21) Appl. No.: 17/729,601

(22) Filed: Apr. 26, 2022

(65) Prior Publication Data

US 2022/0250031 A1    Aug. 11, 2022

Related U.S. Application Data

(63) Continuation of application No. 16/940,964, filed on Jul. 28, 2020, now abandoned, which is a
(Continued)

(30) Foreign Application Priority Data

Jun. 11, 2013    (AU) ................................ 2013902103

(51) Int. Cl.
    *B01J 20/20*    (2006.01)
    *C10L 1/02*    (2006.01)
(Continued)

(52) U.S. Cl.
    CPC .................. *B01J 20/20* (2013.01); *B01J 8/00* (2013.01); *B01J 19/002* (2013.01); *C10G 1/02* (2013.01);
(Continued)

(58) Field of Classification Search
    CPC ... H04L 41/5003; H04L 43/10; H04L 51/046; H04L 51/212; H04L 67/10; H04L 67/53;
(Continued)

(56) References Cited

U.S. PATENT DOCUMENTS

2010/0313882 A1    12/2010    Dottori et al.
2012/0122164 A1    5/2012    El-Shafie
(Continued)

FOREIGN PATENT DOCUMENTS

AU    2010902938    7/2010
WO    WO2010034055 A1    4/2010
(Continued)

OTHER PUBLICATIONS

Fu et al., Activated Carbons for Hydrothermal Decarboxylation of Fatty Acids, American Chemical Society Catalysis, 2011, vol. 1, No. 3, p. 227-231.

*Primary Examiner* — Ellen M McAvoy
*Assistant Examiner* — Chantel Graham
(74) *Attorney, Agent, or Firm* — Bret E. Field; Bozicevic, Field & Francis LLP

(57) ABSTRACT

The present invention relates generally to the generation of bio-products from organic matter feedstocks. More specifically, the present invention relates to improved methods for the hydrothermal/thermochemical conversion of lignocellulosic and/or fossilised organic feedstocks into biofuels (e.g. bio-oils) and/or chemical products (e.g. platform chemicals).

19 Claims, 6 Drawing Sheets

Related U.S. Application Data continuation of application No. 16/560,236, filed on Sep. 4, 2019, now Pat. No. 10,751,690, which is a continuation of application No. 14/896,770, filed as application No. PCT/AU2014/000601 on Jun. 11, 2014, now Pat. No. 10,427,132.

(51) Int. Cl.
| | | |
|---|---|---|
| *B01J 8/00* | (2006.01) | |
| *C10G 1/02* | (2006.01) | |
| *C10G 1/04* | (2006.01) | |
| *C10G 1/08* | (2006.01) | |
| *B01J 19/00* | (2006.01) | |

(52) U.S. Cl.
CPC ............... *C10G 1/04* (2013.01); *C10G 1/083* (2013.01); *C10L 1/02* (2013.01); *B01J 2219/00247* (2013.01); *C10L 2200/0469* (2013.01); *C10L 2290/06* (2013.01); *Y02E 50/10* (2013.01)

(58) Field of Classification Search
CPC ...... H04L 67/56; H04L 67/561; B01J 19/002; B01J 20/20; B01J 2219/00247; B01J 8/00; C10G 1/02; C10G 1/04; C10G 1/083; C10L 1/02; C10L 2200/0469; C10L 2290/06; Y02E 50/10

See application file for complete search history.

(56) References Cited

U.S. PATENT DOCUMENTS

| | | |
|---|---|---|
| 2012/0227822 A1 | 9/2012 | Humphreys |
| 2012/0311658 A1 | 12/2012 | Dozier |
| 2013/0192123 A1 | 8/2013 | Maschmeyer et al. |
| 2013/0205652 A1 | 8/2013 | Humphreys et al. |

FOREIGN PATENT DOCUMENTS

| | | | | |
|---|---|---|---|---|
| WO | WO2010121367 A1 | 10/2010 | | |
| WO | WO2012000033 A1 | 1/2012 | | |
| WO | WO-2012092644 A1 * | 7/2012 | ............... | C10G 1/00 |
| WO | WO2012092644 A1 | 7/2012 | | |

* cited by examiner

BIOREFINING METHOD

INCORPORATION BY CROSS-REFERENCE

This application is a continuation of U.S. patent application Ser. No. 16/940,964, filed Jul. 28, 2020, which is a continuation of U.S. patent application Ser. No. 16/560,236, filed Sep. 4, 2019, and which issued on Aug. 25, 2020 as U.S. Pat. No. 10,751,690, which is a continuation of U.S. patent application Ser. No. 14/896,770, filed Dec. 8, 2015, and which issued on Oct. 1, 2019 as U.S. Pat. No. 10,427,132, which is the United States national phase of International Application No. PCT/AU2014/000601, filed Jun. 11, 2014, which claims priority to Australian provisional patent application number 2013902103 filed on Jun. 11, 2013, each of which is incorporated herein by reference in its entirety.

TECHNICAL FIELD

The present invention relates generally to the generation of bio-products from organic matter feedstocks. More specifically, the present invention relates to improved methods for the hydrothermal/thermochemical conversion of lignocellulosic and/or fossilised organic feedstocks into biofuels (e.g. bio-oils) and/or chemical products (e.g. platform chemicals).

BACKGROUND

The global demand for energy continues to rise while reserves of conventional petroleum (e.g. oil, gas, and natural gas liquids) are in decline. This has led to increased focus and research into unconventional fuel resources (e.g. heavy oil, oil sands, oil shale) and other non-fossil sources of energy (e.g. lignocellulosic materials).

A significant amount of research in the field of "alternative" energy production has focused on the generation of biofuels from lignocellulosic matter. This technology raises the prospect of a shift to an abundant and renewable feedstock for energy production as an alternative to the depleting reserves of hydrocarbon-based raw materials. The enrichment of low energy density fossil fuels (e.g. lignite, peat and oil shale) into high energy fuel products also represents an attractive alternative given the relative abundance of those resources.

In particular, the thermochemical conversion of biomass and other complex organic matter into biofuels and chemicals based on hydrothermal reactions has shown significant promise. In general, it is desirable that such methods are continuous or at least semi-continuous in nature which may lead to improved product characteristics and/or improved process economics in comparison to batch processes. Process economics are also more favourable when increased concentrations of organic matter are used in the thermochemical conversion steps, because the amount of water or other solvent that must be heated to elevated temperatures is less. However, when high concentrations of organic matter are converted at elevated temperature and pressure the main products are frequently viscous solutions. A common problem in such situations is a partial de-solubilisation of organic and incidental inorganic matter, leading to deposition on apparatus surfaces, otherwise known as "scaling". Additionally, when water is used as the primary depolymerisation agent swelling of organic matter can occur restricting the concentration that can be used. The high levels of energy needed to raise and maintain water at reaction temperature can also result in charring on the inside of reactor vessel walls. With prolonged operation such deposits can have an adverse effect on the process, necessitating time-consuming and costly descaling operations in order to restore process performance. Furthermore, at high concentrations of organic matter, the present inventors have observed that a pressure differential (i.e. a pressure gradient) develops along the length of tube reactors under continuous flow operations which is detrimental to process efficiency.

A need exists for improved methods capable of reducing or avoiding problems such as scaling, charring and/or the development of pressure gradients across reactors during the thermochemical conversion of organic matter into bio-products.

SUMMARY OF THE INVENTION

The present inventors have unexpectedly identified that the inclusion of an effective amount of solid substrate to organic matter feedstock used in thermochemical conversion processes reduces scaling and/or reduces the development of pressure differentials during treatment.

In a first aspect, the present invention provides a method for producing a bio-product from organic matter feedstock, the method comprising:
  providing a reaction mixture comprising the organic matter feedstock, a solvent, and a solid substrate;
  treating the reaction mixture in a reactor vessel at a reaction temperature and pressure suitable for conversion of all or a portion of the organic matter feedstock into a product mixture comprising the bio-product; and
  depressurising and cooling the product mixture;
  wherein the solid substrate is solid or substantially solid at the reaction temperature and pressure and;
  sequesters organic and/or inorganic matter that de-solubilises within the reaction mixture or the product mixture; and/or
  alters one or more flow characteristics of the reaction mixture and/or the product mixture in the reactor vessel.

In a second aspect, the present invention provides a method for inhibiting scaling in a reactor vessel during the conversion of organic matter feedstock into a bio-product, the method comprising:
  providing a reaction mixture comprising the organic matter feedstock, a solvent, and a solid substrate;
  treating the reaction mixture at a reaction temperature and pressure suitable for conversion of all or a portion of the organic matter feedstock into a product mixture comprising the bio-product; and
  depressurising and cooling the product mixture;
  wherein the solid substrate is solid or substantially solid at the reaction temperature and pressure and;
  sequesters organic and/or inorganic matter that de-solubilises within the reaction mixture or the product mixture; and/or
  alters one or more flow characteristics of the reaction mixture and/or the product mixture in the reactor vessel.

In one embodiment of the first and second aspects, the treating is performed under continuous flow conditions.

In a third aspect, the present invention provides a method for inhibiting development of a pressure gradient in a continuous flow reactor vessel during the conversion of organic matter feedstock into a bio-product, the method comprising:
  providing a reaction mixture comprising the organic matter feedstock, a solvent, and a solid substrate;

treating the reaction mixture at a reaction temperature and pressure suitable for conversion of all or a portion of the organic matter feedstock into a product mixture comprising the bio-product; and depressurising and cooling the product mixture;

wherein the solid substrate is solid or substantially solid at the reaction temperature and pressure and;

sequesters organic and/or inorganic matter that de-solubilises within the reaction mixture or the product mixture; and/or alters one or more flow characteristics of the reaction mixture and/or the product mixture in the reactor vessel.

In one embodiment of the third aspect, the depressurising is facilitated by a pressure let down device in the reactor vessel;

the reaction mixture is pressurised to a maximum pressure prior to or during the treating; and prior to the depressurising facilitated by the pressure let down device, the product mixture is pressurised at less than 98%, less than 95%, less than 90%, less than 85%, less than 80%, less than 75%, less than 70%, less than 65%, less than 60%, less than 55%, or less than 50%, of the maximum pressure.

In one embodiment of the first, second or third aspects, the solid substrate generates additional metal surface area within the reactor vessel by an abrasive action, to thereby provide additional metal surface area for provision of additional heterogeneous catalysts to the reaction mixture.

In one embodiment of the first, second or third aspects, the solid substrate is inert or substantially inert at the reaction temperature and pressure.

In one embodiment of the first, second or third aspects, the solid substrate is chemically inert or substantially chemically inert at the reaction temperature and pressure.

In one embodiment of the first, second or third aspects, the solid substrate is a carbonaceous material comprising at least 50%, at least 60%, at least 70%, at least 80%, or at least 90% by weight carbon.

In one embodiment of the first, second or third aspects, the solid substrate is selected from the group consisting of: coals, anthracitic coal, meta-anthracite, anthracite semianthracite, bituminous coal, subbituminous coal, lignite (i.e. brown coal), coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, and any combination thereof.

In one embodiment of the first, second or third aspects, the solid substrate is a non-carbonaceous material comprising no more than 10%, no more than 5%, no more than 1%, or no carbon.

In one embodiment of the first, second or third aspects, the solid substrate is selected from the group consisting of fly ash, a mineral, calcium carbonate, calcite, a silicate, silica, quartz, an oxide, a metal oxide, an insoluble or substantially insoluble metal salt, iron ore, a clay mineral, talc, gypsum, and any combination thereof.

In another embodiment of the first, second or third aspects, the solid substrate is selected from the group consisting of carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium, kaolinite, bentonite, illite, zeolites, calcium phosphate, hydroxyapataite, phyllosilicates, and any combination thereof.

In one embodiment of the first, second or third aspects, the solid substrate is provided in the form of a powder, or a slurry comprising the powder.

In one embodiment of the first, second or third aspects, the solid substrate is present in the reaction mixture at a concentration of more than 0.5%, more than 1%, more than 3%, more than 5%, more than 10%, more than 25%, or more than 30% by weight.

In one embodiment of the first, second or third aspects, the solid substrate is present in the reaction mixture at a concentration of less than 0.5%, less than 1%, less than 3%, less than 5%, less than 10%, less than 25%, or less than 50% by weight.

In one embodiment of the first, second or third aspects, the sequestering of the organic and/or inorganic matter by the solid substrate comprises adsorbing the organic matter and/or inorganic matter onto a surface of the solid substrate.

In one embodiment of the first, second or third aspects, the sequestering of the organic and/or inorganic matter by the solid substrate comprises absorption of the organic matter and/or inorganic matter into the solid substrate.

In one embodiment of the first, second or third aspects, the organic matter feedstock is lignocellulosic matter.

In one embodiment of the first, second or third aspects, the organic matter feedstock is lignocellulosic matter comprising at least 10% lignin, at least 35% cellulose, and at least 20% hemicellulose.

In one embodiment of the first, second or third aspects, the organic matter feedstock comprises more than about 10% of each of lignin, cellulose, and hemicellulose.

In one embodiment of the first, second or third aspects, the reaction mixture comprises more than 10%, more than 15%, more than 20%, more than 30%, more than 35%, or more than 40%, of the organic matter by weight.

In one embodiment of the first, second or third aspects, the reaction mixture comprises less than 10%, less than 15%, less than 20%, less than 30%, less than 35%, less than 40%, less than 50%, between 5% and 40%, between 10% to 35%, or between 15% and 30%, of the organic matter by weight.

In one embodiment of the first, second or third aspects, the organic matter feedstock is provided in the form of a liquid slurry comprising some or all of the solvent.

In one embodiment of the first, second or third aspects, the treating comprises treating the organic matter, the solid substrate and the solvent in the form of a slurry.

In one embodiment of the first, second or third aspects, the treating is performed under conditions of continuous flow and the slurry has a flow velocity of above 0.01 cm/s, above 0.05 cm/s, above 0.5 cm/s, above 0.1 cm/s, above 1.5 cm/s, or above 2.0 cm/s.

In one embodiment of the first, second or third aspects, the method further comprises separating the solid substrate from the product mixture after the depressurising and cooling, and recycling the solid substrate into a second slurry or second reaction mixture comprising organic matter feedstock.

In one embodiment of the first, second or third aspects, the reaction mixture further comprises an oil additive.

In one embodiment of the first, second or third aspects, the reaction mixture further comprises an oil additive that is mixed with the feedstock and/or solvent prior to the treating.

In one embodiment of the first, second or third aspects, the reaction mixture further comprises an oil additive that constitutes between 5% and 60%, between 5% and 50%, between 5% and 40%, between 5% and 30%, between 5% and between 20%, more the 5%, more than 10%, more than 15%, more than 20%, more than 30%, less than 20%, less than 15% or less than 10% of the oil additive by weight.

In one embodiment of the first, second or third aspects, the reaction mixture further comprises an oil additive selected from the group consisting of paraffinic oil, gas-oil, crude oil, synthetic oil, coal-oil, bio-oil, shale oil, kerogen oil, mineral oil, white mineral oil, aromatic oil, tall oil, distilled tall oil, plant or animal oils, fats and their acidic forms and esterified forms, and any combination thereof.

In one embodiment of the first, second or third aspects, the solvent is a mixed solvent comprising an aqueous solvent component and an oil solvent component, wherein the two components are substantially immiscible or partly miscible at ambient temperature.

In one embodiment of the first, second or third aspects, the solvent is a mixed solvent comprising an aqueous solvent component and an oil solvent component, wherein the oil component is crude tall oil, distilled tall oil or a combination thereof.

In one embodiment of the first, second or third aspects, the solvent comprises water and oil in a ratio of about 1:1 by mass, of about 1:2 by mass, of about 2:1 by mass, of about 3:1 by mass, of about 1:3 by mass, of about 1:4 by mass, of about 4:1 by mass, of about 1:5 by mass, of about 5:1 by mass, of about 1:6 by mass, of about 6:1 by mass, of about 1:7 by mass, of about 7:1 by mass, of about 1:8 by mass, of about 8:1 by mass, of about 1:9 by mass, of about 9:1 by mass, of about 1:10 by mass, or of about 10:1 by mass.

In one embodiment of the first, second or third aspects, the method further comprises separating oil from the product and recycling the oil into a second slurry or second reaction mixture comprising organic matter feedstock.

In one embodiment of the first, second or third aspects, the method further comprises separating the solid substrate and oil from the product, and recycling the solid substrate and the oil into a second slurry or second reaction mixture comprising organic matter feedstock.

In one embodiment of the first, second or third aspects, the treating comprises treating the reaction mixture at a temperature of between 250° C. and 400° C., and a pressure of between 100 bar and 300 bar.

In one embodiment of the first, second or third aspects, the treating comprises treating the reaction mixture at a temperature of between 310° C. and 360° C., and a pressure of between 160 bar and 250 bar.

In one embodiment of the first, second or third aspects, the treating comprises treating the reaction mixture at a temperature of between 320° C. and 360° C., and a pressure of between 220 bar and 250 bar.

In one embodiment of the first, second or third aspects, the treating comprises treating the reaction mixture at a temperature of between at least about 100° C., at least about 150° C., at least about 200° C., at least about 250° C., at least about 300° C., at least about 350° C., between about 200° C. and about 250° C., between about 200° C. and about 400° C., between about 250° C. and about 400° C., between about 250° C. and about 350° C., and between about 250° C. and about 350° C.; generating subcritical or supercritical steam independently of the slurry; and contacting the slurry with the subcritical or supercritical steam in at least one vessel or chamber of the reactor vessel.

In one embodiment of the first, second or third aspects, the treating comprises pressurising the reaction mixture at a pressure of between about 100 bar and about 400 bar, between about 150 bar and about 400 bar, between about 200 bar and about 400 bar, between about 150 bar and about 350 bar, between about 180 bar and about 350 bar, between about 150 bar and about 300 bar, between about 150 bar and about 280 bar, between about 150 bar and about 270 bar, or between about 200 bar and about 300 bar.

In one embodiment of the first, second or third aspects, the reaction mixture further comprises a catalyst additive.

In one embodiment of the first, second or third aspects, the reaction mixture further comprises a catalyst additive that is mixed with the feedstock and/or solvent prior to the treating.

In one embodiment of the first, second or third aspects, the catalyst additive is added to the reaction mixture after the reaction mixture reaches said reaction temperature and pressure.

In one embodiment of the first, second or third aspects, the catalyst additive is selected from the group consisting of: a base catalyst, an alkali metal hydroxide catalyst, a transition metal hydroxide catalyst, sodium hydroxide, potassium hydroxide, sodium carbonate, potassium carbonate, an acid catalyst, a solid acid catalyst, an alkali metal formate catalyst, a transition metal catalyst, a transition metal formate catalyst, a supported transition metal catalyst, a reactive carboxylic acid catalyst, a transition metal catalyst, a sulphide catalyst, a noble metal catalyst, a water-gas-shift catalyst, sodium formate, potassium formate, sodium hydroxide, and combinations thereof.

In one embodiment of the first, second or third aspects, the catalyst additive is not present, or is substantially not present, in any one or more of the organic matter, the solid substrate, the solvent, or a wall of a reactor vessel in which the method is performed.

In one embodiment of the first, second or third aspects, the catalyst additive is also present in any one or more of the organic matter, the solid substrate, the solvent, or a wall of a reactor vessel in which the method is performed.

In one embodiment of the first, second or third aspects, the catalyst is provided in a slurry comprising the organic matter feedstock, and the catalyst is between 1% and 30%, between 5% and 30%, between 10% and 30%, between 5% and 30%, between 5% and 20%, between 5% and 15%, between 10% and 30%, between 10% and 30%, between 10% and 15%, less than 20%, less than 30%, less than 25%, less than 15%, less than 10%, or less than 5% of the weight of the organic matter in the reaction mixture In one embodiment of the first, second or third aspects, the reaction mixture comprises the organic matter feedstock (e.g. lignocellulosic matter) and the solid substrate at a ratio of about 1:1, about 3:2, about 2:1, about 3:1, about 4:1, about 5:1, about 6:1 about 8:1, about 10:1, about 20:1, or about 30:1.

In one embodiment of the first, second or third aspects, the solid substrate constitutes: at least 1%, at least 2%, at least 3%, at least 4%, at least 5%, at least 6%, at least 7%, at least 8%, at least 9%, at least 10%, at least 15%, at least 20%, at least 30%, at least 40%, at least 50%, between 1 wt % and 20%, between 1% and 10%, between 1% and 5%, between 5% and 10%, between 5% and 15%, between 5% and 20%, between 20% and 40%, between 20% and 50%, between 20% and 30%, between 30% and 40%, or between 40% and 50% of the total combined mass of the solid substrate and organic matter feedstock (e.g. lignocellulosic matter) in the reaction mixture.

In one embodiment of the first, second or third aspects, the reaction mixture comprises less than 20%, less than 30%, less than 35%, less than 40%, less than 40%, less than 70%, less than 80%, less than 90%, less than 95%, between 10% and 95%, between 30% and 95%, between 50% to 70%, or between 60% to 80%, of the solvent by weight.

In one embodiment of the first, second or third aspects, the solvent is an aqueous solvent, an oil solvent, or a mixture of an aqueous solvent and an oil solvent.

In one embodiment of the first, second or third aspects, the he oil solvent or the mixture of the aqueous solvent and the oil solvent comprises crude tall oil, distilled tall oil, or a combination thereof.

In one embodiment of the first, second or third aspects, the oil solvent is recycled from a bio-product produced according to the method.

In one embodiment of the first, second or third aspects, the solid substrate solvent is recycled from a bio-product produced according to the method.

In one embodiment of the first, second or third aspects, the oil solvent and solid substrate are recycled in a mixture from a bio-product produced according to the method, and the mixture of recycled oil and recycled substrate is solid at ambient temperature.

In one embodiment of the first, second or third aspects, the aqueous solvent comprises water, or water and an alcohol.

In one embodiment of the first, second or third aspects, the aqueous solvent comprises water and an alcohol, and the alcohol is selected from ethanol, methanol, or a combination of methanol and ethanol.

In one embodiment of the first, second or third aspects, prior to and/or after the treating, the reaction mixture comprises a percentage by weight of said alcohol of more than 3%, more than 5%, more than 10%, more than 15%, more than 20%, more than 25%, more than 30%, less than 30%, less than 25%, less than 20%, less than 15%, less than 10%, less than 5%, or less than 3%.

In one embodiment of the first, second or third aspects, the bio-product comprises an oil component having a gross calorific value of at least 30 MJ/kg, at least 32 MJ/kg, at least 35 MJ/kg, or at least 36 MJ/kg, and a mixed substrate and oil component having a gross calorific value of at least 26 MJ/kg, at least 28 MJ/kg, at least 30 MJ/kg, at least 32 MJ/kg, or at least 33 MJ/kg.

In one embodiment of the first, second or third aspects, the bio-product comprises a compound selected from the group consisting of: waxes; aldehydes; carboxylic acids; carbohydrates; phenols; furfurals; alcohols; ketones; resins; resin acids; compounds structurally related to resin acids; alkanes; alkenes; fatty acids; fatty acid esters; sterols; sterol-related compounds; furanic oligomers; cyclopentanones; cyclohexanones; alkyl- and alkoxy-cyclopentanones; alkyl- and alkoxy-cyclohexanones; cyclopenteneones; alkyl- and alkoxy-cyclopentenones; aromatic compounds; naphthalenes; alkyl- and alkoxy-substituted naphthalenes; cresols; alkyl- and alkoxy-phenols; alkyl- and alkoxy-catechols; alkyl- and alkoxy-dihydroxybezenes; alkyl- and alkoxy-hydroquinones; indenes; indene-derivatives, and any combination thereof.

In one embodiment of the first, second or third aspects, the slurry is subjected to:
  (a) heating and pressurisation to a target temperature and pressure,
  (b) treatment at target temperature(s) and pressure(s) for a defined time period (i.e. the "retention time"), and
  (c) cooling and de-pressurisation,
under continuous flow conditions.

In one embodiment of the first, second or third aspects, the method comprises a first preheating stage in which the reaction mixture is heated to a temperature that is below the reaction temperature, and a second heating stage in which the reaction mixture is heated to the reaction temperature.

In one embodiment of the first, second or third aspects, the second heating stage comprises contacting the reaction mixture with subcritical or supercritical steam.

In one embodiment of the first, second or third aspects, the catalyst additive is added to the reaction mixture before the first preheating stage.

In one embodiment of the first, second or third aspects, the catalyst additive is added to the reaction mixture during or after the first preheating stage and prior to the second heating stage.

In one embodiment of the first, second or third aspects, the catalyst additive is added to the reaction mixture during or after the second heating stage.

In one embodiment of the first, second or third aspects, the treating is for a time period of between about 20 minutes and about 30 minutes.

In one embodiment of the first, second or third aspects, the method comprises the step of heating the organic matter feedstock and solvent to the temperature in a time period of less than about 2 minutes, prior to the treating.

In one embodiment of the first, second or third aspects, the method comprises the step of heating and pressurising the organic matter feedstock and solvent to the temperature and pressure in a time period of less than about 2 minutes, prior to the treating.

In one embodiment of the first, second or third aspects, the method comprises the steps of:
  (i) cooling the product mixture to a temperature of between about 160° C. and about 200° C. in a time period of less than about 30 seconds after said treating; and
  (ii) depressurisation and cooling the product mixture to ambient temperature by release through a pressure let down device.

In one embodiment of the first, second or third aspects, the pressure let down device is enveloped in ambient temperature water.

In one embodiment of the first, second or third aspects, the solid substrate is made from residue obtained by distillation or pyrolysis of the bio-product.

In one embodiment of the first, second or third aspects, the bio-product comprises one or more of an oil component, a char component, an aqueous component comprising a solution of organic chemicals in water, and a gaseous component comprising: methane, hydrogen, carbon monoxide and/or carbon dioxide.

In one embodiment of the first, second or third aspects, the bio-product comprises a bio-oil.

In one embodiment of the first, second or third aspects, the bio-product is fractionated to provide platform chemicals.

In one embodiment of the first, second or third aspects, the treating comprises heating and pressurising the slurry in at least one vessel or chamber of the reactor vessel.

In one embodiment of the first, second or third aspects, the treating comprises generating subcritical or supercritical steam independently of the slurry and contacting the slurry with the subcritical or supercritical steam in at least one vessel or chamber of said reactor vessel.

In one embodiment of the first, second or third aspects, the slurry is at ambient or near ambient temperature and pressure prior to said contacting with the subcritical or supercritical steam.

In one embodiment of the first, second or third aspects, the treating comprises: heating the slurry to a temperature selected from the group consisting of at least about 100° C., at least about 150° C., at least about 200° C., at least about 250° C., at least about 300° C., at least about 350° C., between about 200° C. and about 250° C., between about 200° C. and about 400° C., between about 250° C. and about 400° C., between about 250° C. and about 350° C., and between about 250° C. and about 350° C.; generating subcritical or supercritical steam independently of the slurry; and contacting the slurry with the subcritical or supercritical steam in at least one vessel or chamber of the reactor vessel.

In one embodiment of the first, second or third aspects, the slurry is pressurised prior to and/or after said contacting.

In one embodiment of the first, second or third aspects, the depressurising and cooling of the product mixture occurs simultaneously.

In one embodiment of the first, second or third aspects, the depressurising and cooling of the product mixture occurs separately.

In one embodiment of the first, second or third aspects, the organic matter feedstock (e.g. lignocellulosic matter) is present in an amount of between 5 wt % and 50 wt %, between 10 wt % and 40 wt %, or between 5 wt % and 30 wt %, of the slurry and/or the reaction mixture.

In one embodiment of the first, second or third aspects, the organic matter feedstock (e.g. lignocellulosic matter) is present in an amount of more than 5 wt % of the slurry and/or the reaction mixture.

In one embodiment of the first, second or third aspects, the organic matter feedstock (e.g. lignocellulosic matter) is present in an amount of at least 5 wt %, at least 10 wt %, at least 15 wt %, at least 20 wt %, or at least 30 wt % of the slurry and/or the reaction mixture.

In one embodiment of the first, second or third aspects, the solid substrate is present in the slurry and/or reaction mixture in an amount of between 0.5 wt % and 50 wt % of the total wt % amount of the organic matter feedstock (e.g. lignocellulosic matter) present in the slurry and/or reaction mixture.

In one embodiment of the first, second or third aspects, the organic matter feedstock is wood (e.g. radiat pine).

In a fourth aspect, the present invention provides a bio-product obtained by the method of the first, second or third aspect.

BRIEF DESCRIPTION OF THE DRAWINGS

Preferred embodiments of the present invention will now be described, by way of example only, with reference to the accompanying drawings wherein:

FIG. 4A shows gauge pressure near the start of the reactor (pressure in) and near the end of the reactor (pressure out) versus experimental duration for a run (Run 1—Table 2) without substrate. FIG. 4B shows gauge pressure near the start of the reactor (pressure in) and near the end of the reactor (pressure out) versus experimental duration for a run (Run 2—Table 2) without substrate. FIG. 4C shows gauge pressure near the start of the reactor (pressure in) and near the end of the reactor (pressure out) versus experimental duration for a run (Run 7—Table 2) with substrate (lignite). FIG. 4D shows gauge pressure near the start of the reactor (pressure in) and near the end of the reactor (pressure out) versus experimental duration for a run (Run 9—Table 2) with substrate (lignite). FIG. 4E shows gauge pressure near the start of the reactor (pressure in) and near the end of the reactor (pressure out) versus experimental duration for a run (Run E—Table 7) with substrate (lignite).

DEFINITIONS

Figure 1:
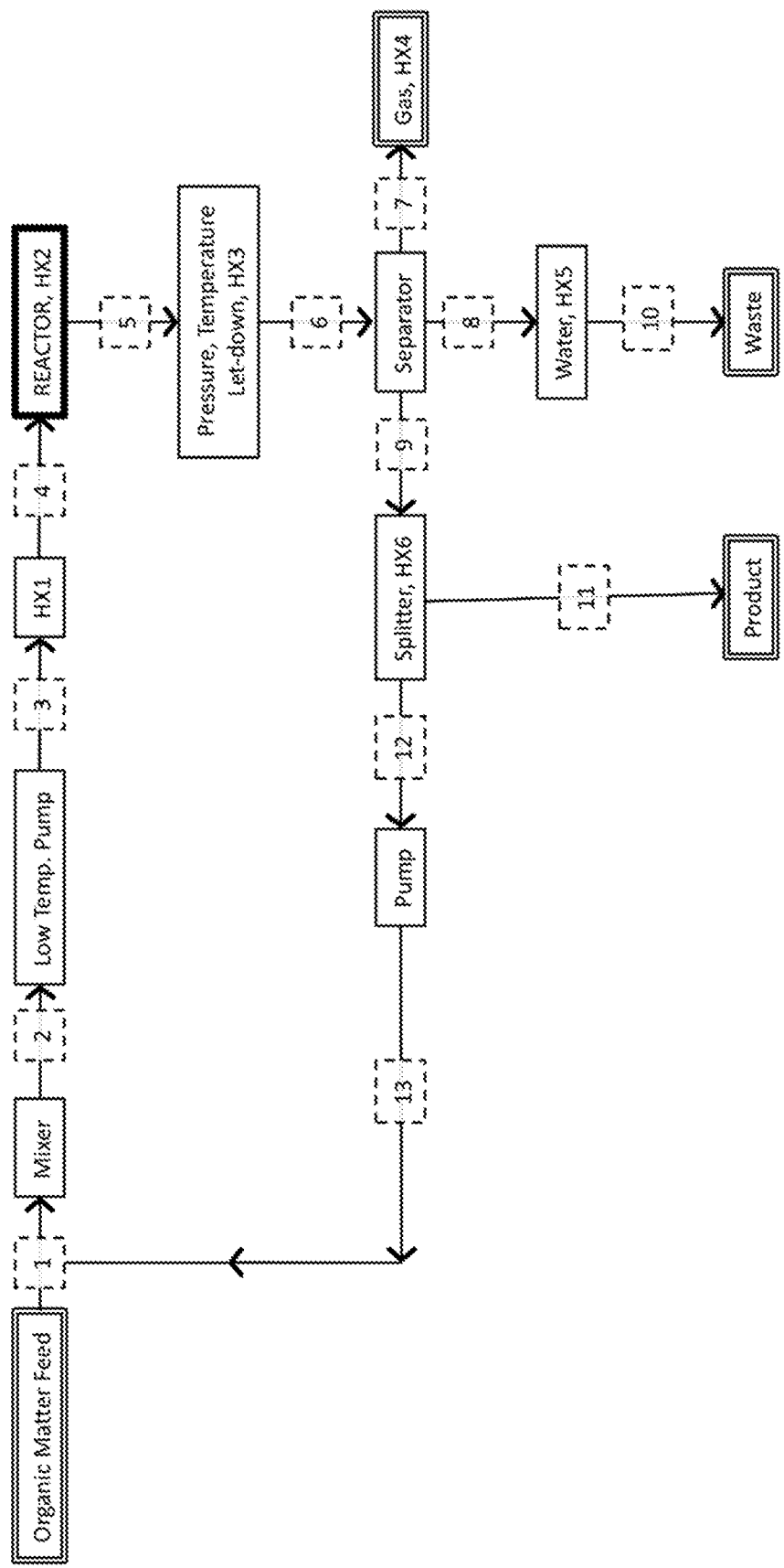
FIG. 1 is a schematic flow diagram showing an apparatus for converting organic matter into bio-products in accordance with an embodiment of the invention. The pressure drop across the reactor is measured between points 4 and 5.

As used in this application, the singular form "a", "an" and "the" include plural references unless the context clearly dictates otherwise. For example, the term "a catalyst" also includes a plurality of catalysts.

As used herein, the term "comprising" means "including." Variations of the word "comprising", such as "comprise" and "comprises," have correspondingly varied meanings. Thus, for example, a bio-product "comprising" a bio-oil may consist exclusively of bio-oil or may include other additional substances.

As used herein, the terms "organic matter" and "organic materials" have the same meaning and encompass any material comprising carbon including both fossilised and non-fossilised materials. Non-limiting examples of organic matter include renewable sources of biomass (e.g. lignocellulosic matter), as well as hydrocarbon-containing materials (e.g. lignite, oil shale and peat) which may be non-renewable.

As used herein the term "bio-product" encompasses any product that can be obtained by the treatment of organic matter feedstock as defined above in accordance with the methods of the present invention. Non-limiting examples of bio-products include biofuels (e.g. bio-oils, char products, gaseous products) and chemical products (e.g. platform chemicals, organic acids, furanics, furfural, hydroxymethylfurfural, levoglucosan, sorbitol, cylitol, arabinitol, formaldehyde, acetaldehyde).

As used herein, the term "biofuel" refers to an energy-containing material derived from the treatment of organic matter feedstock as defined above in accordance with the methods of the present invention. Non-limiting examples of biofuels include bio-oils, char products (e.g. upgraded pulvarised coal injection (PCI) equivalent products and fuels for direct injection carbon engines (DICE)), and gaseous products (a gaseous product comprising methane, hydrogen, carbon monoxide and/or carbon dioxide).

As used herein the term "bio-oil" refers to a complex mixture of compounds derived from the treatment of organic matter feedstock as defined above in accordance with the methods of the present invention. The bio-oil may comprise compounds including, but not limited to, any one or more of alkanes, alkenes, aldehydes, carboxylic acids, carbohydrates, phenols, furfurals, alcohols, and ketones. The bio-oil may comprise multiple phases including, but not limited to, a water-soluble aqueous phase which may comprise, compounds including, but not limited to, any one or more of carbohydrates, aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-dihydroxybezenes, alkyl- and alkoxy-hydroquinones, indenes and indene-derivatives; and a water-insoluble phase which may comprise, compounds including, but not limited to, any one or more of waxes, aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-dihydroxybezenes, alkyl- and alkoxy-hydroquinones, indenes and indene-derivatives.

As used herein, the terms "lignocellulosic matter" and "lignocellulosic biomass" are used interchangeably and have the same meaning. The terms encompass any substance comprising lignin, cellulose, and hemicellulose. By way of non-limiting example, the lignocellulosic matter may comprise at least 10% lignin, at least 10% cellulose and at least 10% hemicellulose.

As used herein, the term "fossilised organic matter" encompasses any organic material that has been subjected to geothermal pressure and temperature for a period of time sufficient to remove water and concentrate carbon to significant levels. For example, fossilised organic material may comprise more than about 10%, 20%, 30%, 40%, 50%, 60%, 70%, 75%, 80%, 85%, 90% or 95 wt % carbon. Non-limiting examples of fossilised organic matter include coals (e.g. anthracitic coals such as meta-anthracite, anthracite and semianthracite; bituminous coals; subbituminous coals; lignite (i.e. brown coal), coking coal, coal tar, coal tar derivatives, coal char), cokes (e.g. high temperature coke, foundry coke, low and medium temperature coke, pitch coke, petroleum coke, coke oven coke, coke breeze, gas coke, brown coal coke, semi coke), peat (e.g. milled peat, sod peat), kerogen, tar sands, oil shale, shale tar, asphalts, asphaltines, natural bitumen, bituminous sands, or any combination thereof.

As used herein, the term "solvent" includes within its scope an "aqueous solvent", an "oil solvent", and combinations thereof.

As used herein, the term "aqueous solvent" refers to a solvent comprising at least one percent water based on total weight of solvent. An "aqueous solvent" may therefore comprise between one percent water and one hundred percent water based on total weight of solvent. An "aqueous solvent" will also be understood to include within its scope "aqueous alcohol", "aqueous ethanol", and "aqueous methanol".

As used herein, the term "aqueous alcohol" refers to a solvent comprising at least one percent alcohol based on total weight of solvent.

As used herein, the term "aqueous ethanol" refers to a solvent comprising at least one percent ethanol based on total weight of solvent.

As used herein, the term "aqueous ethanol" refers to a solvent comprising at least one percent methanol based on total weight of solvent.

As used herein, the term "oil solvent" refers to a solvent comprising any suitable oil, non-limiting examples of which include paraffinic oil, gas-oil, crude oil, synthetic oil, coal-oil, bio-oil, shale oil/kerogen oil, aromatic oils (i.e. single or multi-ringed components or mixtures thereof), tall oils, triglyceride oils, fatty acids, ether extractables, hexane extractables, and any mixture of any of the previous components, and in which the oil constitutes at least one percent of the solvent based on total solvent weight.

As used herein the term "oil additive" refers to any suitable oil component for inclusion in a feedstock, solvent and/or reaction mixture according to the present invention, non-limiting examples of which include paraffinic oil, gas-oil, crude oil, synthetic oil, coal-oil, bio-oil, shale oil/kerogen oil, aromatic oils (i.e. single or multi-ringed components or mixtures thereof), tall oils, triglyceride oils, fatty acids, ether extractables, hexane extractables, and any mixture of any of the previous components. The oil additive may constitute at least one percent portion of the feedstock, solvent and/or reaction mixture to which it is added, based on total weight of the feedstock, solvent and/or reaction mixture.

As used herein, a "supercritical" substance (e.g. a supercritical solvent) refers to a substance that is heated above its critical temperature and pressurised above its critical pressure (i.e. a substance at a temperature and pressure above its critical point).

As used herein, a "subcritical" substance (e.g. a subcritical solvent) refers to a substance at a temperature and/or pressure below the critical point of the substance. Accordingly, a substance may be "subcritical" at a temperature below its critical point and a pressure above its critical point, at a temperature above its critical point and a pressure below its critical point, or at a temperature and pressure below its critical point.

As used herein, a "solid substrate" is a component that is solid or substantially solid at a reaction temperature and pressure used in accordance with the methods of the present invention. The solid substrate may be capable of sequestering organic and/or inorganic matter that de-solubilises within the reaction mixture and/or a product mixture produced from the reaction mixture. Additionally or alternatively, the solid substrate may be capable of altering the flow characteristics of the reaction mixture or the product mixture in a reactor vessel. Solid substrates encompass both carbonaceous and non-carbonaceous materials, non-limiting examples of which include coals, anthracitic coal, meta-anthracite, anthracite semianthracite, bituminous coal, sub-bituminous coal, lignite (i.e. brown coal), coking coal, coal tar, coal tar derivatives, coal char, coke, high temperature coke, foundry coke, low and medium temperature coke, pitch coke, petroleum coke, coke oven coke, coke breeze, gas coke, brown coal coke, semi coke, charcoal, pyrolysis char, hydrothermal char, carbon black, graphite fine particles, amorphous carbon, carbon nanotubes, carbon nanofibers, vapor-grown carbon fibers, fly ash, a mineral, calcium carbonate, calcite, a silicate, silica, quartz, an oxide, a metal oxide, an insoluble or substantially insoluble metal salt, iron ore, a clay mineral, talc, gypsum, carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium, kaolinite, bentonite, illite, zeolites, calcium phosphate, hydroxyapataite, phyllosilicates, and any combination thereof.

As used herein, the term "continuous flow" refers to a process wherein a slurry comprising organic matter feedstock and any one or more of: a solvent, solid substrate, catalyst additive and/or oil additive, is subjected to:
  (a) heating and pressurisation to a target temperature and pressure,
  (b) treatment at target temperature(s) and pressure(s) for a defined time period (a "retention time"), and
  (c) cooling and de-pressurisation;
  during which the slurry is maintained in a stream of continuous movement along the length (or partial length) of a given surface of a reactor vessel. It will be understood that "continuous flow" conditions as contemplated herein are defined by a starting point of heating and pressurisation (i.e. (a) above) and by an end point of cooling and de-pressurisation (i.e. (c) above). Continuous flow conditions as contemplated herein imply no particular limitation regarding flow velocity of the slurry provided that it is maintained in a stream of continuous movement.

As used herein, a "catalyst additive" is a catalyst incorporated into a feedstock slurry and/or reaction mixture that is supplementary to catalytic compounds intrinsically present in organic matter feedstock treated in accordance with the methods of the invention, catalytic compounds intrinsically present in any solvent used in accordance with the methods of the invention, catalytic compounds intrinsically present in a solid substrate used to perform the methods of the invention, and/or catalytic compounds intrinsically present in the walls of a reactor apparatus used to perform the methods of the invention.

As used herein, the term "intrinsic catalyst" will be understood to be a catalyst that is innately present in a given reaction component such as, for example, any one or more of organic matter feedstock, an aqueous solvent, and/or vessel walls of a reactor apparatus, or, a catalyst that form in situ during the treatment process.

As used herein, the terms "reactor", "reactor apparatus", and "reactor vessel" are used interchangeably and have the same meaning. Each term encompasses any apparatus suitable for performing the methods of the present invention including, for example, continuous flow reactors and batch reactors.

As used herein a "substantially solid" substrate refers to a substrate that is predominantly solid at a specified reaction temperature and/or pressure in that at least 50%, at least 60%, at least 70%, at least 80%, at least 90%, preferably at least 95%, and more preferably at least 98% of the substrate is in a solid form.

As used herein, a "substantially insoluble" substance is one that is predominantly insoluble at a specified reaction temperature and/or pressure in that at least 90%, preferably at least 95%, and more preferably at least 98% of the substrate is not solubilised.

As used herein, an "inert" or "chemically inert" solid substrate is one that does not chemically react with other components in a reaction mixture or catalyse reactions between components in a reaction mixture, at a specified reaction temperature and pressure or at a range of reaction temperatures and pressures.

As used herein, a "substantially inert" or "substantially chemically inert" solid substrate one that does not to any significant degree chemically react with other components in a reaction mixture or catalyse reactions between components in a reaction mixture, at a specified reaction temperature and pressure or at a range of reaction temperatures and pressures. A "substantially inert" or "substantially chemically inert" solid substrate will be understood to react with any other component in a given reaction mixture, or catalyse a reaction between any given components in a reaction mixture, on less than 5%, less than 4%, less than 3%, less than 2%, or less than 1%, of interaction events with the component(s). It will be understood that use of the term "about" herein in reference to a recited numerical value (e.g. a temperature or pressure) includes the recited numerical value and numerical values within plus or minus ten percent of the recited value.

It will be understood that use of the term "between" herein when referring to a range of numerical values encompasses the numerical values at each endpoint of the range. For example, a temperature range of between 10° C. and 15° C. is inclusive of the temperatures 10° C. and 15° C.

Any description of a prior art document herein, or a statement herein derived from or based on that document, is not an admission that the document or derived statement is a part of the common general knowledge of the relevant art.

For the purposes of description all documents referred to herein are incorporated by reference in their entirety unless otherwise stated.

DETAILED DESCRIPTION OF THE INVENTION

Current methods for the production of bio-oil from organic matter suffer from a number of drawbacks. Apart from the generally high oxygen content and poor stability of most bio-oils, the need to conduct depolymerisation reactions at high temperature and pressure requires a reactor apparatus (e.g. continuous flow reactors, batch reactors and the like) introducing additional difficulties.

For example, water is generally used as the primary depolymerisation agent in hydrothermal liquefaction processes (e.g. hydrothermal upgrading (HTU) and catalytic hydrothermal reactor technology (Cat-HTR)). The use of water restricts the concentration of organic matter (e.g. lignocellulosic biomass) that can be used in slurry feedstock in a reactor due to swelling. Moreover, high energy levels are required to heat water up to reaction temperature (and maintain it there) resulting in charring on the inside of the reactor vessel walls. Although the use of a suitable co-solvent such as ethanol offers a potential means of reducing charring it also significantly increases the overall cost of the process. Ballistic heating is another method that may be used to minimise charring. This process involves the rapid convergence of two separate streams (a slurry stream and a sub/supercritical water stream) in a ballistic heating chamber. However, the cost of the supercritical boiler used in ballistic heating and associated water de-ionisation stage has a significantly adverse effect on cost efficiency.

Another disadvantage of known methods for bio-oil production that use hydrothermal liquefaction of organic matter feedstock is that the product typically comprises multiple layers of oil having different chemical properties. Separation of the different layers can be difficult and requires additional resources.

A further disadvantage of known methods for bio-oil production that use hydrothermal liquefaction of organic matter feedstock is that when high concentrations of liquefied organic matter (e.g. lignocellulosic matter) are flowing in a tube reactor it has been determined by the present inventors that a large pressure difference may develop between the upstream and downstream reactor elements. During operation of a large tube reactor under continuous flow conditions a large pressure differential is typically sufficient to prevent further operation of the reactor for operational control and safety reasons.

An additional disadvantage of known methods for bio-oil production that use hydrothermal liquefaction of organic matter feedstock is that when high concentrations of liquefied organic matter are flowing in a tube reactor it has been observed that organic and/or inorganic matter may deposit on the reactor walls, particularly where the tube profile changes, for example at unions or bends linking two straight reactor tube elements.

The present invention relates to the unexpected finding that at least one of the aforementioned disadvantages can be alleviated by incorporating a solid substrate into the feed material and/or reaction mixture used in hydrothermal liquefaction processes. The solid substrate is generally one which remains solid or substantially solid at the reaction temperature and pressure utilised.

Without limitation to particular mechanism(s) of action, it is postulated that the solid substrate additive may act as an alternative deposition locus for de-solubilised organic and/or inorganic materials that would otherwise deposit as scale on the reactor walls. This sequestration effect may be enhanced where the substrate has a high surface area per unit mass. Additionally or alternatively, it is proposed that the presence of the solid substrate may alter the flow characteristics of the feedstock slurry, reaction mixture and/or product mixture. These and other potential mechanisms may be responsible for the observed reduction in pressure differential that otherwise develops between the upstream and downstream reactor elements when higher concentrations of organic matter (e.g. lignocellulosic matter) are used in slurry feed, and/or the observed reduction in deposition of organic and/or inorganic matter on reactor vessel walls (scaling).

Furthermore and again without limitation to mechanistic theory, it is postulated that the solid substrate may additionally enhance the properties of bio-products by the methods of the present invention by making available additional metal surface area within the reactor by a mild abrasive action on the surfaces that would otherwise be protected by means of a passivation layer. These additional metal surfaces may act as heterogeneous catalysts for favourable reactions (e.g. decarboxylation and hydrogen-transfer reactions, and other reaction types).

Accordingly, certain aspects of the present invention relate to methods for producing bio-products by treating organic matter feedstock with various solvents and in the presence of solid substrates at increased temperature and pressure. Additional aspects of the present invention relate to bio-products generated by the methods described herein.

The methods of the present invention are demonstrated to provide several notable advantages.

One such advantage is the prevention of pressure build-up and/or scale formation in reactors during the conversion of organic matter feedstock into bio-products (e.g. biofuels, platform chemicals) at high temperature and pressure. In particular, when the conversion process is conducted under continuous flow conditions in a tube reactor or similar, the development of a pressure differential across the reactor and/or scaling on reactor walls may require operations to be terminated and necessitate expensive and time-consuming descaling or cleaning procedures. A second advantage is that inclusion of the solid substrate may assist in increasing the availability of metal surfaces in the reactor that can partake in heterogeneous catalysis. A third advantage is that if a liquid biofuel is pyrolytically distilled from a product mixture comprising the solid substrate after de-pressurisation and separation (see methodology in Examples), a char can be generated that can be recycled to provide solid substrate for treatment of additional organic matter feedstock. Furthermore, char produced in excess of solid substrate requirements is a renewable carbon-rich solid product with suitability for use in bio-char carbon sequestration, fuel and/or chemical applications.

Organic Matter

The present invention provides methods for the conversion of organic matter feedstock into bio-products (e.g. biofuels including bio-oils; chemical products etc.). As used herein, "organic matter" (also referred to herein as "organic material") encompasses any matter comprising carbon, including both fossilised and non-fossilised forms of carbon-comprising matter.

No limitation exists regarding the particular type of organic matter feedstocks utilised in the methods of the invention, although it is contemplated that the use of a solid substrate in accordance with the methods of the present invention may be more beneficial during the conversion of non-fossilised forms of organic matter (e.g. lignocellulosic matter) compared to fossilised forms of organic matter.

Organic matter utilised in the methods of the invention may comprise naturally occurring organic matter (e.g. lignocellulosic biomass and the like) and/or synthetic organic materials (e.g. synthetic rubbers, plastics, nylons and the like). In some embodiments, organic matter utilised in the methods of the invention comprises a mixture of fossilised organic matter and non-fossilised organic matter (e.g. lignocellulosic matter). In such cases, the fossilised organic matter may remain solid at reaction temperature and pressure in which case it may act as a solid substrate as described herein. In the case where more than one type (i.e. a mixture) of organic matter is utilised, no limitation exists regarding the particular proportion of the different components of organic matter.

In preferred embodiments, organic matter utilised in the methods of the invention is or comprises lignocellulosic matter. Lignocellulosic matter as contemplated herein refers to any substance comprising lignin, cellulose and hemicellulose.

For example, the lignocellulosic matter may be a woody plant or component thereof. Examples of suitable woody plants include, but are not limited to, pine (e.g. *Pinus radiata*), birch, eucalyptus, bamboo, beech, spruce, fir, cedar, poplar, willow and aspen. The woody plants may be coppiced woody plants (e.g. coppiced willow, coppiced aspen).

Additionally or alternatively, the lignocellulosic matter may be a fibrous plant or a component thereof. Non-limiting examples of fibrous plants (or components thereof) include grasses (e.g. switchgrass), grass clippings, flax, corn cobs, corn stover, reed, bamboo, bagasse, hemp, sisal, jute, cannabis, hemp, straw, wheat straw, abaca, cotton plant, kenaf, rice hulls, and coconut hair.

Additionally or alternatively, the lignocellulosic matter may be derived from an agricultural source. Non-limiting examples of lignocellulosic matter from agricultural sources include agricultural crops, agricultural crop residues, and grain processing facility wastes (e.g. wheat/oat hulls, corn fines etc.). In general, lignocellulosic matter from agricultural sources may include hard woods, soft woods, hard-wood stems, softwood stems, nut shells, branches, bushes, canes, corn, corn stover, cornhusks, energy crops, forests, fruits, flowers, grains, grasses, herbaceous crops, wheat straw, switchgrass, salix, sugarcane bagasse, cotton seed hairs, leaves, bark, needles, logs, roots, saplings, short rotation woody crops, shrubs, switch grasses, trees, vines, cattle manure, and swine waste.

Additionally or alternatively, the lignocellulosic matter may be derived from commercial or virgin forests (e.g. trees, saplings, forestry or timber processing residue, scrap wood such as branches, leaves, bark, logs, roots, leaves and products derived from the processing of such materials, waste or byproduct streams from wood products, sawmill and paper mill discards and off-cuts, sawdust, and particle board).

Additionally or alternatively, the lignocellulosic matter may be derived from industrial products and by-products. Non-limiting examples include wood-related materials and woody wastes and industrial products (e.g. pulp, paper (e.g. newspaper) papermaking sludge, cardboard, textiles and cloths, dextran, and rayon).

It will be understood that organic material used in the methods of the invention may comprise a mixture of two or more different types of lignocellulosic matter, including any combination of the specific examples provided above.

The relative proportion of lignin, hemicellulose and cellulose in a given sample will depend on the specific nature of the lignocellulosic matter.

By way of example only, the proportion of hemicellulose in a woody or fibrous plant used in the methods of the invention may be between about 15% and about 40%, the proportion of cellulose may be between about 30% and about 60%, and the proportion of lignin may be between about 5% and about 40%. Preferably, the proportion of hemicellulose in the woody or fibrous plant may be between about 23% and about 32%, the proportion of cellulose may be between about 38% and about 50%, and the proportion of lignin may be between about 15% and about 25%.

In some embodiments, lignocellulosic matter used in the methods of the invention may comprise between about 2% and about 35% lignin, between about 15% and about 45% cellulose, and between about 10% and about 35% hemicellulose.

In other embodiments, lignocellulosic matter used in the methods of the invention may comprise between about 20% and about 35% lignin, between about 20% and about 45% cellulose, and between about 20% and about 35% hemicellulose.

In some embodiments, the lignocellulosic matter may comprise more than about 5%, 10%, 15%, 20%, 25%, 30%, 35%, 40%, 45%, or 50% lignin.

In some embodiments, the lignocellulosic matter may comprise more than about 5%, 10%, 15%, 20%, 25%, 30%, 35%, 40%, 45%, or 50% cellulose.

In some embodiments, the lignocellulosic matter may comprise more than about 5%, 10%, 15%, 20%, 25%, 30%, 35%, 40%, 45%, or 50% hemicellulose.

The skilled addressee will recognize that the methods described herein are not constrained by the relative proportions of lignin, hemicellulose and cellulose in a given source of lignocellulosic matter.

In certain embodiments of the invention, a mixture of organic material comprising lignite (brown coal) and lignocellulosic matter may be utilised as organic matter feedstock in the methods of the invention. The lignocellulosic matter of the mixture may, for example, comprise woody plant material and/or fibrous plant material. The proportion of lignite in the mixture may be greater than about 20%, 40%, 60% or 80%. Alternatively, the proportion of lignocellulosic matter in the mixture may be greater than about 20%, 40%, 60% or 80%.

In some preferred embodiments, organic matter utilised in the methods of the invention comprises carbon-containing polymeric materials, non-limiting examples of which include rubbers (e.g. tyres), plastics and polyamides (e.g. nylons).

Non-limiting examples of suitable rubbers include natural and synthetic rubbers such as polyurethanes, styrene rubbers, neoprenes, polybutadiene, fluororubbers, butyl rubbers, silicone rubbers, plantation rubber, acrylate rubbers, thiokols, and nitrile rubbers.

Non-limiting examples of suitable plastics include PVC, polyethylene, polystyrene, terphtalate, polyethylene and polypropylene.

Organic matter feedstocks utilised in the methods of the invention may comprise carbon-containing wastes such as sewage, manure, or household or industrial waste materials.

Pre-Treatment of Organic Matter

Organic matter utilised in the methods of the present invention may optionally be pre-treated prior converting it into bio-product(s).

It will be recognised that no strict requirement exists to perform a pre-treatment step when using the methods described herein. For example, pre-treatment of the organic matter may not be required if it is obtained in the form of a liquid or in a particulate form. However, it is contemplated that in many cases pre-treatment of the organic matter may be advantageous in enhancing the outcome of the methods described herein.

In general, pre-treatment may be used to break down the physical and/or chemical structure of the organic matter making it more accessible to various reagents utilised in the methods of the invention (e.g. oil-based solvent, catalysts and the like) and/or other reaction parameters (e.g. heat and pressure). In certain embodiments, pre-treatment of organic matter may be performed for the purpose of increasing solubility, increasing porosity and/or reducing the crystallinity of sugar components (e.g. cellulose). Pre-treatment of the organic matter may be performed using an apparatus such as, for example, an extruder, a pressurized vessel, or batch reactor.

Pre-treatment of the organic matter may comprise physical methods, non-limiting examples of which include grinding, chipping, shredding, milling (e.g. vibratory ball milling), compression/expansion, agitation, and/or pulse-electric field (PEF) treatment.

Additionally or alternatively, pre-treatment of the organic matter may comprise physio-chemical methods, non-limiting examples of which include pyrolysis, steam explosion, ammonia fiber explosion (AFEX), ammonia recycle percolation (ARP), and/or carbon-dioxide explosion. Pre-treatment with steam explosion may additionally involve agitation of the organic matter.

Additionally or alternatively, pre-treatment of the organic matter may comprise chemical methods, non-limiting examples of which include ozonolysis, acid hydrolysis (e.g. dilute acid hydrolysis using $H_2SO_4$ and/or HCl), alkaline hydrolysis (e.g. dilute alkaline hydrolysis using sodium, potassium, calcium and/or ammonium hydroxides), oxidative delignification (i.e. lignin biodegradation catalysed by the peroxidase enzyme in the presence of $H_2O_2$), and/or the organosolvation method (i.e. use of an organic solvent mixture with inorganic acid catalysts such as $H_2SO_4$ and/or HCl to break lignin-hemicellulose bonds).

Additionally or alternatively, pre-treatment of the organic matter may comprise biological methods, non-limiting examples of which include the addition of microorganisms (e.g. rot fungi) capable of degrading/decomposing various component(s) of the organic matter.

In some embodiments, organic matter used in the methods of the present invention is lignocellulosic matter which may be subjected to an optional pre-treatment step in which hemicellulose is extracted. Accordingly, the majority of the hemicellulose (or indeed all of the hemicellulose) may be extracted from the lignocellulosic matter and the remaining material (containing predominantly cellulose and lignin) used to produce a biofuel by the methods of the invention. However, it will be understood that this pre-treatment is optional and no requirement exists to separate hemicellulose from lignocellulosic matter when performing the methods of the present invention. Suitable methods for the separation of hemicellulose from lignocellulosic matter are described, for example, in PCT publication number WO/2010/034055, the entire contents of which are incorporated herein by reference.

For example, the hemicellulose may be extracted from lignocellulosic matter by subjecting a slurry comprising the lignocellulosic matter (e.g. 5%-15% w/v solid concentration) to treatment with a mild aqueous acid (e.g. pH 6.5-6.9) at a temperature of between about 100° C. and about 250° C., a reaction pressure of between about 2 and about 50 atmospheres, for between about 5 and about 20 minutes. The solubilised hemicellulose component may be separated from the remaining solid matter (containing predominantly cellulose and lignin) using any suitable means (e.g. by use of an appropriately sized filter). The remaining solid matter may be used directly in the methods of the invention, or alternatively mixed with one or more other forms of organic matter (e.g. lignite) for use in the methods of the invention.

Slurry Characteristics

Organic matter feedstock utilised in accordance with the methods of the present invention is preferably treated in the form of a slurry. The slurry may comprise the organic matter in combination with a solvent (e.g. an aqueous solvent, an aqueous alcohol solvent, an aqueous ethanol solvent, an aqueous methanol solvent) optionally in combination with a solid substrate, a catalyst additive, and/or an oil additive. The slurry may be generated, for example, by generating a particulate form of the organic matter (e.g. by physical methods such as those referred to above and/or by other means) and mixing with the solvent.

No particular limitation exists regarding the relative proportions of solvent, feedstock, oil additive and/or solid substrate in the slurry. Non-limiting examples of potential quantities of these various components are described in the sections below.

Organic Matter Feedstock Component

A slurry for use in accordance with the methods of the present invention will generally comprise organic matter feedstock.

In certain embodiments of the invention, the concentration of organic matter in the slurry may be less than about 85 wt %, less than about 75 wt %, or less than about 50 wt %. Alternatively, the concentration of organic matter may be more than about 10 wt %, more than about 20 wt %, more than about 30 wt %, more than about 40 wt %, more than about 50 wt %, or more than about 60 wt %. In some embodiments the slurry may comprise between about 35 wt % and about 45 wt % of an oil additive. In other embodiments, the slurry may comprise about 40 wt % oil or 39.5 wt % of an oil additive.

The optimal particle size of solid components of the organic matter feedstock and the optimal concentration of those solids in the slurry may depend upon factors such as, for example, the heat transfer capacity of the organic matter utilised (i.e. the rate at which heat can be transferred into and through individual particles), the desired rheological properties of the slurry and/or the compatibility of the slurry with component/s of a given apparatus within which the methods of the invention may be performed (e.g. reactor tubing). The optimal particle size and/or concentration of solid components of the organic matter components in a slurry used for the methods of the present invention can readily be determined by a person skilled in the art using standard techniques. For example, a series of slurries may be generated, each sample in the series comprising different particle sizes and/or different concentrations of the solid organic matter components compared to the other samples. Each slurry can then be treated in accordance with the methods of the invention under a conserved set of reaction conditions. The optimal particle size and/or concentration of solid organic matter components can then be determined upon analysis and comparison of the products generated from each slurry using standard techniques in the art.

In certain embodiments of the invention, the particle size of solid organic matter components in the slurry may be between about 10 microns and about 10,000 microns. For example, the particle size may be more than about 50, 100, 500, 750, 1000, 2000, 3000, 4000, 5000, 6000, 7000, 8000 or 9000 microns. Alternatively, the particle size may less than about 50, 100, 500, 750, 1000, 2000, 3000, 4000, 5000, 6000, 7000, 8000 or 9000 microns. In some embodiments, the particle size is between about 10 microns and about 50 microns, between about 10 microns and about 100 microns, between about 10 microns and about 200 microns, between about 10 microns and about 500 microns, between about 10 microns and about 750 microns, or between about 10 microns and about 1000 microns. In other embodiments, the particle size is between about between about 100 microns and about 1000 microns, between about 100 microns and about 750 microns, between about 100 microns and about 500 microns, or between about 100 microns and about 250 microns.

Solvent Component

A slurry for use in accordance with the methods of the present invention will generally comprise a solvent component. The solvent may be an aqueous solvent, an oil solvent, or a combination thereof.

The solvent may comprise or consist of water.

In certain embodiments of the invention, the concentration of water in the slurry may be above about 80 wt %, above about 85 wt %, or above about 90 wt %. Accordingly, the concentration of water may be above about 75 wt %, above about 70 wt %, above about 60 wt %, above about 50 wt %, above about 40 wt %, or above about 30 wt %. In some embodiments, the concentration of water is between about 90 wt % and about 95 wt %.

In some embodiments the slurry comprises between about 10 wt % and about 30 wt % water. In other preferred embodiments, the slurry comprises about 20 wt % oil or about 15 wt % water.

In some embodiments, the water is recycled from the product of the process. For example, a portion water present following completion of the reaction may be taken off as a side stream and recycled into the slurry.

The solvent may comprise or consist of one or more aqueous alcohol/s.

For example, it may be suitable or preferable to use an aqueous alcohol as the solvent when the organic matter used in the methods consists of or comprises a significant amount of lignocellulosic material and/or other materials such rubber and plastics due to the stronger chemical bonds in these types of organic matter.

Suitable alcohols may comprise between one and about ten carbon atoms. Non-limiting examples of suitable alcohols include methanol, ethanol, isopropyl alcohol, isobutyl alcohol, pentyl alcohol, hexanol and iso-hexanol.

The slurry may comprise more than about 5 wt %, 10 wt %, 15 wt %, 20 wt %, 25 wt %, 30 wt %, 35 wt %, 40 wt %, 45 wt % or 50 wt % alcohol aqueous alcohol.

In certain embodiments, the solvent comprises a mixture of two or more aqueous alcohols. Preferably, the alcohol is ethanol, methanol or a mixture thereof.

Solid Substrate Component

A slurry for use in accordance with the methods of the present invention may comprise a solid substrate component as described herein.

Favourable characteristics of the solid substrate may include any one or more of the following: it remains inert or substantially inert at the reaction temperature and pressure used; it remains unaltered or substantially unaltered upon completion of the process; it remains as a solid or substantially solid at the reaction temperatures and pressures used; it is of low or moderate hardness so that it does not induce substantial abrasion or erosive corrosion in reactors (e.g. continuous flow reactors); it has a high internal or external specific surface area so that it can adsorb and/or absorb large quantities of bio-products and/or other precipitates during the conversion process.

The solid substrate may be a carbonaceous material. By way of non-limiting example only, the solid substrate may be a carbonaceous material comprising at least 50%, at least 60%, at least 70%, at least 80%, at least 90%, or at least 95% by weight carbon.

Non-limiting examples of suitable carbonaceous materials for use as the solid substrate include coals (e.g. anthracitic coals such as meta-anthracite, anthracite and semianthracite; bituminous coals, subbituminous coals, lignite (i.e. brown coal), coking coal, coal tar, coal tar derivatives, coal char); cokes (e.g. high temperature coke, foundry coke, low and medium temperature coke, pitch coke, petroleum coke, coke oven coke, coke breeze, gas coke, brown coal coke, semi coke); charcoal; pyrolysis char; hydrothermal char; carbon black; graphite fine particles; amorphous carbon; carbon nanotubes; carbon nanofibers; vapor-grown carbon fibers; and any combination thereof.

In some preferred embodiments of the present invention the solid substrate may be a carbon rich char made from the previous processing of organic matter according to the present invention followed by a thermal treatment in the substantial absence of oxygen to remove volatile materials (e.g. by pyrolysis or vacuum distillation at temperatures in the range of 200° C. to 800° C.).

The solid substrate may be a non-carbonaceous material. By way of non-limiting example only, the solid substrate may be a non-carbonaceous material comprising less than 20%, less than 10%, less than 5%, less than 3%, less than 2%, or less than 1%, by weight carbon, or comprise no carbon.

Non-limiting examples of suitable non-carbonaceous materials for use as the solid substrate include ash (e.g. fly ash); minerals (e.g. calcium carbonate, calcite, silicates, silica, quartz, oxides including iron ore, clay minerals, talc, gypsum); an insoluble or substantially insoluble metal salt; and any combination thereof.

Further non-limiting examples of suitable materials for use as the solid substrate include carbonates of calcium, carbonates of magnesium, carbonates of calcium and magnesium, calcite, limestone, dolomite, hydroxides of calcium, hydroxides of magnesium, oxides of calcium, oxides of magnesium, hydrogen carbonates of calcium, hydrogen carbonates of magnesium, kaolinite, bentonite, illite, zeolites, calcium phosphate, hydroxyapataite, phyllosilicates, and any combination thereof.

In certain embodiments of the present invention, the concentration of solid substrate in the slurry may be less than about 20 wt %, less than about 15 wt %, or less than about 10 wt %. Alternatively, the concentration of solid substrate may be more than about 0.5 wt %, more than about 1 wt %, more than about 3 wt %, more than about 5 wt %, more than about 50 8 wt %, or more than about 10 wt %.

The optimal particle size and optimal concentration of the solid substrate may depend upon factors such as, for example, the heat transfer capacity of the organic matter utilised (i.e. the rate at which heat can be transferred into and through individual particles), the desired rheological properties of the slurry and/or the compatibility of the slurry with component/s of a given apparatus within which the methods of the invention may be performed (e.g. reactor tubing). The optimal particle size and/or concentration of the solid substrate component in a slurry used for the methods of the invention can readily be determined by a person skilled in the art using standard techniques. For example, a series of slurries may be generated, each sample in the series comprising a specific solid substrate of different size and/or different concentration to those of other samples. Each slurry can then be treated in accordance with the methods of the invention under a conserved set of reaction conditions. The optimal solid substrate size and/or concentration can then be determined upon analysis and comparison of the products generated from each slurry using standard techniques in the art.

In certain embodiments of the invention, the size of a solid substrate component in the slurry may be between about 10 microns and about 10,000 microns. For example, the size may be more than about 50, 100, 500, 750, 1000, 2000, 3000, 4000, 5000, 6000, 7000, 8000 or 9000 microns. Alternatively, the size may less than about 50, 100, 500, 750, 1000, 2000, 3000, 4000, 5000, 6000, 7000, 8000 or 9000 microns. In some embodiments, the size is between about 10 microns and about 50 microns, between about 10 microns and about 100 microns, between about 10 microns and about 200 microns, between about 10 microns and about 500 microns, between about 10 microns and about 750 microns, or between about 10 microns and about 1000 microns. In other embodiments, the size is between about between about 100 microns and about 1000 microns, between about 100 microns and about 750 microns, between about 100 microns and about 500 microns, or between about 100 microns and about 250 microns.

In some embodiments of the invention, the particle size distributions and particle surface charge characteristics of the organic matter component of the slurry and/or the solid substrate component of the slurry may be optimized in order to provide desirable slurry characteristics when mixed, for example, to obtain minimum viscosity for a given solids content. The optimal particle size and/or particle surface charge of solid components in a given slurry used can readily be determined by a person skilled in the art using standard techniques. For example, a series of slurries may be generated, each sample in the series comprising different particle sizes and/or different concentrations of solid components compared to the other samples. Each slurry can then be treated in accordance with the methods of the invention under a conserved set of reaction conditions. The optimal particle size and/or particle surface charge of solid organic matter components can then be determined upon analysis and comparison of the products generated from each slurry using standard techniques known in the art.

Catalysts

The conversion of organic matter feedstock into bio-products using the methods of the present invention may be enhanced by the use of one or more catalyst additives. Although some catalysts may be an intrinsic component of the organic matter (e.g. minerals), solvent (e.g. hydronium/hydroxide ions of water, compound/s in the oil), solid substrate, and/or vessel walls of a reactor apparatus in which the organic matter may be treated (e.g. transition/noble metals), the invention contemplates the use of catalyst additive(s) to enhance the production of biofuel from organic material.

Accordingly, certain embodiments of the invention relate to the production of bio-products from organic matter by treatment with a solvent, a solid substrate and optionally an oil additive under conditions of increased temperature and pressure in the presence of at least one catalyst additive. By catalyst additive it will be understood that the catalyst is supplementary to catalytic compounds intrinsically present in the organic matter, solvent, solid substrate, and/or walls of a reactor apparatus in which the method is performed.

For example, an embodiment of the invention in which an organic matter feedstock (e.g. lignocellulosic matter) is treated with a solvent and a solid substrate under conditions of increased temperature and pressure in a reactor apparatus would not be considered to utilise an catalyst additive.

Alternatively, an embodiment of the invention in which an organic matter feedstock (e.g. lignocellulosic matter) is mixed with a solvent, a solid substrate and a supplementary base catalyst (e.g. sodium hydroxide) added, and the resulting mixture then treated under conditions of increased temperature and pressure in a reactor apparatus, the method would be considered to utilise an catalyst additive.

Although the use of catalyst additive/s may be advantageous in certain circumstances, the skilled addressee will recognise that the methods of the invention may be performed without using them.

An catalyst additive as contemplated herein may be any catalyst that enhances the formation of biofuel from organic matter using the methods of the invention, non-limiting examples of which include base catalysts, acid catalysts, alkali metal hydroxide catalysts, transition metal hydroxide catalysts, alkali metal formate catalysts, transition metal formate catalysts, reactive carboxylic acid catalysts, transition metal catalysts, sulphide catalysts, noble metal catalysts, water-gas-shift catalysts, and combinations thereof. Suitable catalysts are described, for example, in United States of America patent publication number 2012-0311658 A1 entitled "Methods for biofuel production", the entire contents of which are incorporated herein by reference.

The optimal quantity of an catalyst additive used in the methods of the invention may depend on a variety of different factors including, for example, the type of organic matter under treatment, the volume of organic matter under treatment, the solvent utilised, the specific temperature and pressure employed during the reaction, the type of catalyst and the desired properties of the biofuel product. By following the methods of the invention, the optimal quantity of an catalyst additive to be used can be determined by one skilled in the art without inventive effort.

In certain embodiments, an catalyst additive or combination of catalyst additives may be used in an amount of between about 0.1% and about 10% w/v catalysts, between about 0.1% and about 7.5% w/v catalysts, between about 0.1% and about 5% w/v catalysts, between about 0.1% and about 2.5% w/v catalysts, between about 0.1% and about 1% w/v catalysts, or between about 0.1% and about 0.5% w/v catalysts (in relation to the solvent).

In general, the catalyst additives may be used to create or assist in forming and/or maintaining a reducing environment favouring the conversion of organic matter to biofuel. The reducing environment may favour hydrolysis of the organic matter, drive the replacement of oxygen with hydrogen, and/or stabilise the biofuel formed.

Treatment under subcritical conditions (as opposed to supercritical conditions) may be advantageous in that less energy is required to perform the methods and reaction components may be better preserved during treatment. When subcritical conditions are utilised it is contemplated that the additional use of one or more catalysts may be particularly beneficial in increasing the yield and/or quality of the bio-products. Further, the cost benefits of reduced input energy (i.e. to maintain subcritical rather than supercritical conditions) and preservation of the solvent may significantly outweigh the extra cost incurred by additionally including one or more of the catalyst additives described herein.

It is contemplated that under conditions of increased temperature and pressure water molecules in the solvent may dissociate into acidic (hydronium) and basic (hydroxide) ions facilitating hydrolysis of solid organic matter under treatment (i.e. solid to liquid transformation). In certain embodiments, the temperature and pressure at which the reaction is performed may be sufficiently high for desired levels of hydrolysis to occur without the use of catalyst additives. In other cases, the temperature and pressure at which the reaction is performed may not be sufficiently high for desired levels of hydrolysis to occur without the further addition of catalyst additives.

The catalyst additives may be hydrolysis catalysts. In certain embodiments, the hydrolysis catalysts may be base catalysts. Any suitable base catalyst may be used.

Non-limiting examples of suitable base catalysts for hydrolysis include alkali metal salts, transition metal salts, organic bases, and mixtures thereof.

The alkali metal salts or transition metal salts may comprise any inorganic anion(s), non-limiting examples of which include sulfate, sulfite, sulfide, disulfide, phosphate, aluminate, nitrate, nitrite, silicate, hydroxide, methoxide, ethoxide, alkoxide, carbonate and oxide.

Preferred alkali metal or transition metal salts are sodium, potassium, iron, calcium and barium salts, and may comprise one or more anions selected from phosphate, aluminate, silicate, hydroxide, methoxide, ethoxide, carbonate, sulphate, sulphide, disulphide and oxide.

Non-limiting examples of suitable organic bases include ammonia, basic and polar amino-acids (e.g. lysine, histidine, arginine), benzathin, benzimidazole, betaine, cinchonidine, cinchonine, diethylamine, diisopropylethylamine, ethanolamine, ethylenediamine, imidazole, methyl amine, N-methylguanidine, N-methylmorpholine, N-methylpiperidine, phosphazene bases, picoline, piperazine, procain, pyridine, quinidine, quinoline, trialkylamine, tributylamine, triethyl amine, trimethylamine and mixtures thereof.

In certain embodiments, the hydrolysis catalysts may be acid catalysts although it will be recognised that acid catalysts may generally slower in catalysing hydrolysis of the organic matter than base catalysts. Any suitable acid catalyst may be used.

Non-limiting examples of suitable acid catalysts for hydrolysis include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments, acid catalyst(s) for hydrolysis may be present in minerals of the organic matter and/or derived from the in situ formation of carboxylic acids and/or phenolics during the treatment process. In these cases the acid catalyst are not catalyst additives, but instead considered to be intrinsic catalysts.

In certain embodiments of the invention, a mixture of one or more additive acid hydrolysis catalysts and one or more additive base hydrolysis catalysts may be used to enhance hydrolysis of solid matter under treatment.

The methods of the invention may employ catalyst additives for hydrolysis of the organic matter (as discussed in the preceding paragraphs). Additionally or alternatively, the methods may utilise catalysts that increase and/or accelerate the removal of oxygen (either directly or indirectly) from compounds in the organic matter under treatment. The removal of oxygen may provide a number of advantageous effects such as, for example, increasing the energy content and stability of the biofuel produced.

An additive acid catalyst may be used to enhance the removal of oxygen, for example, by dehydration (elimination) of water. Accordingly, in certain embodiments an acid catalyst may be used to enhance hydrolysis, and to enhance the removal of oxygen from organic matter under treatment.

Any suitable acid catalyst may be used to enhance oxygen removal. Non-limiting examples of suitable acid catalysts for oxygen removal include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments alumino-silicates including hydrated forms (e.g. zeolites) may be used during the treatment of organic matter to assist in dehydration (elimination) of water.

Additionally or alternatively, the removal of oxygen may be enhanced by thermal means involving decarbonylation of, e.g. aldehydes (giving $R_3C-H$ and CO gas) and decarboxylation of carboxylic acids in the material under treatment (giving $R_3C-H$ and $CO_2$ gas). The speed of these reactions may be enhanced by additive acid and/or transition (noble) metal catalysts. Any suitable transition or noble metal may be used including those supported on solid acids. Non-limiting examples include $Pt/Al_2O_3/SiO_2$, $Pd/Al_2O_3/SiO_2$, $Ni/Al_2O_3/SiO_2$, and mixtures thereof.

Additionally or alternatively, a combined acid and hydrogenation catalyst additive may be used to enhance the removal of oxygen, for example, by hydrodeoxygenation (i.e. elimination of water (via acid component) and saturation of double bonds (via metal component)). Any suitable combined acid and hydrogenation catalyst may be used including those supported on solid acids. Non-limiting examples include $Pt/Al_2O_3/SiO_2$, $Pd/Al_2O_3/SiO_2$, $Ni/Al_2O_3/SiO_2$, $NiO/MoO_3$, $CoO/MoO_3$, $NiO/WO_2$, zeolites loaded with noble metals (e.g. ZSM-5, Beta, ITQ-2), and mixtures thereof.

The methods of the invention may employ catalyst additives that enhance hydrolysis of the organic matter under treatment, and/or catalysts that enhance the removal of oxygen from compounds in the organic matter (as discussed in the preceding paragraphs).

Additionally or alternatively, the methods may utilise catalyst additives that enhance the concentration of hydrogen (either directly or indirectly) into compounds of the organic matter under treatment. The concentration of hydrogen may provide a number of advantageous effects such as, for example, increasing the energy content and stability of the biofuel produced.

An additive transfer hydrogenation catalyst may be used to enhance the concentration of hydrogen into compounds of the organic matter under treatment, for example, by transfer hydrogenation or in situ hydrogen generation.

Any suitable transfer hydrogenation catalyst may be used to increase the concentration of hydrogen. Non-limiting examples of suitable transfer hydrogenation catalysts include alkali metal hydroxides (e.g. sodium hydroxide), transition metal hydroxides, alkali metal formates (e.g. sodium formate), transition metal formates, reactive carboxylic acids, transition or noble metals, and mixtures thereof.

In certain embodiments, an additive sodium hydroxide catalyst is utilised in the reaction mixture at a concentration of between about 0.1M and about 0.5M.

In other embodiments additive low-valent iron species catalysts (including their hydrides) are utilised in the reaction mixture, including iron zero homogeneous and heterogeneous species.

The alkali metal hydroxide or formate may comprise any suitable alkali metal. Preferred alkali metals include sodium, potassium, and mixtures thereof. The transition metal hydroxide or formate may comprise any suitable transition metal, preferred examples including Fe and Ru. The reactive carboxylic acid may be any suitable carboxylic acid, preferred examples including formic acid, acetic acid, and mixtures thereof. The transition or noble metal may be any suitable transition or noble metal, preferred examples including platinum, palladium, nickel, ruthenium, rhodium, and mixtures thereof.

Additionally or alternatively, an additive transition metal catalyst may be used to enhance the concentration of hydrogen into organic matter under treatment, for example, by hydrogenation with $H_2$. Non-limiting examples of suitable transition metal catalysts for hydrogenation with $H_2$ include zero-valent metals (e.g. iron, platinum, palladium, and nickel), transition metal sulfides (e.g. iron sulfide (FeS, $Fe_xS_y$), and mixtures thereof.

Additionally or alternatively, an additive water gas shift catalyst may be used to enhance the concentration of hydrogen into organic matter under treatment (i.e. via a water-gas shift reaction). Any suitable water gas shift (WGS) catalyst may be used including, for example, transition metals, transition metal oxides, and mixtures thereof (e.g. magnetite, platinum-based WGS catalysts, finely divided copper and nickel).

Additionally or alternatively, the concentration of hydrogen into organic matter under treatment may be facilitated by in situ gasification (i.e. thermal catalysis). The in situ gasification may be enhanced by additive transition metals. Any suitable transition metal may be used including, for example, those supported on solid acids (e.g. $Pt/Al_2O_3/SiO_2$, $Pd/Al_2O_3/SiO_2$, $Ni/Al_2O_3/SiO_2$, and mixtures thereof), and transition metal sulfides (e.g. $Fe_xS_y$, $FeS/Al_2O_3$, $FeS/SiO_2$, $FeS/Al_2O_3/SiO_2$, and mixtures thereof). Table 1 below provides a summary of various exemplary catalysts that may be employed in the methods of the invention and the corresponding reactions that they may catalyse.

TABLE 1 summary catalysts and corresponding reactions

| Reaction Type | Catalyst Family | Catalyst Family Member | Specific example(s) | Preferred catalysts/ comments |
|---|---|---|---|---|
| Hydrolysis | Base catalysts | Sub/super-critical water | Hydroxide ion in sub/super-critical water | |
| | | All alkali and transition metal salts, both cations and anions can contribute, Include all common inorganic anions Any organic base | M = any alkali or transition metal A = anions, including: aluminate, sulfate, sulfite, sulfide phosphate, phosphite nitrate, nitrite silicate hydroxide alkoxide carbonate oxide ammonia, pyridine, etc. | M = Na, K, Fe, Ca, Ba A = aluminate, phosphate, silicate, hydroxide, methoxide, ethoxide carbonate sulphate sulphide disulphide ($FeS_2$) oxide |
| Hydrolysis | Acid catalysts (slower) | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals |
| Dehydration (elimination) | Acid catalysts | Sub/super-critical water | Hydronium ion in sub/super-critical water | |
| | | Any liquid mineral or organic acid | HA, where A = anions, including: aluminate, sulfate, sulfite, sulfide phosphate, phosphite nitrate, nitrite silicate | Acids may form from the in-situ formation of carboxylic acids, phenolics and the presence of minerals. zeolites or alumino-silicates in general may be |

TABLE 1-continued summary catalysts and corresponding reactions

| Reaction Type | Catalyst Family | Catalyst Family Member | Specific example(s) | Preferred catalysts/ comments |
|---|---|---|---|---|
| | | | hydroxide alkoxide carbonate carboxy group | added |
| Transfer Hydrogenation or in-situ $H_2$ generation | Transfer hydrogenation catalysts | All alkali and transition metal hydroxides and formates All reactive carboxylic acids All transition and noble metals | M = any alkali or transition metal A = hydroxide, formate All transition and noble metals | M = Na, K A = hydroxide, formate formic, acetic M = Fe, Pd, Pd, Ni Ru Rh |
| Decarboxylation | Largely thermal | Acid and transition (noble) metal cats have been reported to aid the process | All transition and noble metals supported on solid acids | $Pt/Al_2O_3/SiO_2$ $Pd/Al_2O_3/SiO_2$ $Ni/Al_2O_3/SiO_2$ |
| Decarbonylation | Largely thermal | As for decarboxylation | As for decarboxylation | As for decarboxylation |
| In-situ gasification | Largely thermal | Transition metals | supported transition metals sulfides | $Pt/Al_2O_3/SiO_2$ $Pd/Al_2O_3/SiO_2$ $Ni/Al_2O_3/SiO_2$ Fe $Fe_xS_y$ $FeS/Al_2O_3$ $FeS/SiO_2$ $FeS/Al_2O_3/SiO_2$ |
| Water-Gas Shift | WGS catalysts | Standard WGS catalysts | As per literature | As per literature |
| Direct Hydrogenation with $H_2$ | Transition metals | Zero valent metals Sulfides | | Fe, Pt, P, Ni as zero valent FeS, FexSy |
| Hydrode-oxygenation | Combined acid and hydrogenation catalyst | Transition metal and solid acid | M = transition metal A = acidic solid | $Pt/Al_2O_3/SiO_2$ $Pd/Al_2O_3/SiO_2$ $Ni/Al_2O_3/SiO_2$ $NiO/MoO_3$ $CoO/MoO_3$ $NiO/WO_2$ zeolites loaded with noble metals, e.g. ZSM-5, Beta, ITQ-2 |

Catalyst additives for use in the methods of the invention may be produced using chemical methods known in the art and/or purchased from commercial sources.

It will be understood that no particular limitation exists regarding the timing at which the catalyst additive(s) may be applied when performing the methods of the invention. For example, the catalyst additive(s) may be added to the organic matter, solvent, solid substrate, oil additive, or a mixture of one or more of these components (e.g. a slurry) before heating/pressurisation to target reaction temperature and pressure, during heating/pressurisation to target reaction temperature and pressure, and/or after reaction temperature and pressure are reached. The timing of catalyst additive addition may depend on the reactivity of the feedstock utilised. For example, highly reactive feedstocks may benefit from catalyst additive addition close to or at the target reaction temperature and pressure, whereas less reactive feedstocks may have a broader process window for catalyst additive addition (i.e. the catalysts may be added prior to reaching target reaction temperature and pressure).

Catalyst additives may be included in a reaction mixture used for treatment according to the present invention prior to heating and/or pressurising the reaction mixture, during heating and/or pressurising of the reaction mixture, and/or after the reaction mixture reaches a desired reaction temperature and/or reaction pressure.

Oil Component

In some preferred embodiments of the invention, the slurry, the reaction mixture, or both comprises organic matter mixed with an oil additive. The oil additive may act as an oil-solvent in the reaction. The oil may be any suitable oil, non-limiting examples of which include paraffinic oil, gas-oil, crude oil, synthetic oil, coal-oil, bio-oil, shale oil/kerogen oil, aromatic oils (i.e. single or multi-ringed components or mixtures thereof), tall oils, triglyceride oils, fatty acids, ether extractables, hexane extractables and any mixture of any of the previous components. The oil may be incorporated into the slurry mixture at any point before target reaction temperature and/or pressure are reached. For example, the oil may be added to the slurry in a slurry mixing tank as shown in FIG. 1. Additionally or alternatively, the oil may be added to the slurry en route to a reactor and/or during heating/pressurisation of the slurry.

In particularly preferred embodiments, the oil is a bio-oil product recycled from the process. For example, a portion of the bio-oil produced may be taken off as a side stream and recycled into the slurry, reaction mixture, or both.

In some preferred embodiments, the bio-oil is recycled in combination with solid substrate, each being a component of the bio-product. For example, a portion of the bio-oil produced mixed with solid substrate may be taken off as a side stream and recycled into the slurry, reaction mixture, or both.

No particular limitation exists regarding the proportion of oil additive in a slurry comprising organic matter treated in accordance with the methods of the present invention. For example, the slurry may comprise more than about 2 wt % oil, more than about 5 wt % oil, more than about 10 wt % oil, or more than about 20, 30, 40, 50, 60 or 70 wt % oil. Alternatively, the slurry may comprise less than about 98 wt % oil, less than about 95 wt % oil, less than about 90 wt % oil, or less than about 80, 70, 60, 50, 40 or 30 wt % oil.

In some preferred embodiments the slurry comprises between about 10 wt % and about 30 wt % organic matter, between about 2 wt % and about 15 wt % solid substrate, and between about 50 wt % and about 90 wt % solvent where the solvent is a mixture of oil and aqueous phase in any proportion.

In some preferred embodiments, the slurry comprises between about 40 wt % and about 50 wt % oil. In other preferred embodiments, the slurry comprises about 45 wt % oil.

In other preferred embodiments the slurry comprises a feedstock to oil ratio of 0.5-1.2:1. The oil may be paraffinic oil.

Reaction Conditions

In accordance with the methods of the present invention, organic matter feedstock (e.g. lignocellulosic matter) may be treated with a solvent in the presence of a solid substrate as described herein, and optionally in the presence of an oil additive and/or an catalyst additive, under conditions of increased temperature and pressure to produce bio-products.

The specific conditions of temperature and pressure used when practicing the methods of the invention may depend on a number different factors including, for example, the type of solvent used, the type of organic matter feedstock under treatment, the physical form of the organic matter feedstock under treatment, the relative proportions of components in the reaction mixture (e.g. the proportion of solvent, additive oil, catalyst additives, organic matter feedstock and/or any other additional component/s), the types of additive catalyst(s) utilised (if present), the retention time, and/or the type of apparatus in which the methods are performed. These and other factors may be varied in order to optimise a given set of conditions so as to maximise the yield and/or reduce the processing time. In preferred embodiments, all or substantially all of the organic material used as a feedstock is converted into bio-product(s).

Desired reaction conditions may be achieved, for example, by conducting the reaction in a suitable apparatus (e.g. a sub/supercritical reactor apparatus) capable of maintaining increased temperature and increased pressure.

Temperature and Pressure

According to the methods of the present invention a reaction mixture is provided and treated at a target temperature and pressure for a fixed time period ("retention time") facilitating the conversion of organic matter feedstock (e.g. lignocellulosic matter) into bio-product(s). The temperature and/or pressure required to drive conversion of organic feedstock into biofuel using the methods of the invention will depend on a number of factors including the type of organic matter under treatment and the relative proportions of components in the reaction (e.g. the proportion of solvent, additive oil, catalyst additives, organic matter feedstock and/or any other additional component/s), the types of additive catalyst(s) utilised (if present), the retention time, and/or the type of apparatus in which the methods are performed. It will be recognised that various catalyst additives as described herein (see sub-section above entitled "Catalysts") may be used to increase the efficiency of reactions which may in turn reduce the temperature and/or pressure required to drive conversion of the organic matter to bio-products using a given solvent and a solid substrate. Based on the description of the invention provided herein the skilled addressee could readily determine appropriate reaction temperature and pressure for a given reaction mixture. For example, the optimal reaction temperature and/or pressure for a given feedstock slurry may be readily determined by the skilled addressee by preparing and running a series of reactions that differ only by temperature and/or pressure utilised and analysing the yield and/or quality of the target bio-product(s) produced.

The skilled addressee will also recognise that the pressure utilised is a function of the slurry components and pressure drop, induced by the slurry, and strongly dependent on any particular reactor design (e.g. pipe diameter and/or length etc).

In certain embodiments, treatment of organic matter feedstock to produce a bio-product using the methods of the invention may be conducted at temperature(s) of between about 150° C. and about 550° C. and pressure(s) of between about 10 bar and about 400 bar. Preferably, the reaction mixture is maintained at temperature(s) of between about 150° C. and about 500° C. and pressure(s) of between about 80 bar and about 350 bar. More preferably the reaction mixture is maintained at temperature(s) of between about 180° C. and about 400° C. and pressure(s) of between about 100 bar and about 330 bar. Still more preferably the reaction mixture is maintained at temperature(s) of between about 200° C. and about 380° C. and pressure(s) of between about 120 bar and about 250 bar.

In preferred embodiments, the reaction mixture is maintained at temperature(s) of between about 200° C. and about 400° C., and pressure(s) of between about 100 bar and about 300 bar.

In other preferred embodiments, the reaction mixture is maintained at temperature(s) of between about 250° C. and about 380° C., and pressure(s) of between about 50 bar and about 300 bar.

In other preferred embodiments, the reaction mixture is maintained at temperature(s) of between about 320° C. and about 360° C. and pressure(s) of between about 150 bar and about 250 bar. In other preferred embodiments, the reaction mixture is maintained at temperature(s) of between about 330° C. and about 350° C. and pressure(s) of between about 230 bar and about 250 bar. In another particularly preferred embodiment, the reaction mixture is maintained at temperature(s) of about 340° C. and pressure(s) of between about 240 bar.

In other preferred embodiments, the reaction mixture is maintained at temperature(s) of between about 320° C. and about 360° C., and pressure(s) of between about 220 bar and about 250 bar.

In certain embodiments, the reaction mixture is maintained at temperature(s) of above about 180° C. and pressure(s) above about 150 bar. In other embodiments, the reaction mixture is maintained at temperature(s) of above about 200° C. and pressure(s) above about 180 bar. In additional embodiments, reaction mixture is maintained at temperature(s) of above about 250° C. and pressure(s) above about 200 bar. In other embodiments, reaction mixture is maintained at temperature(s) of above about 300° C. and pressure(s) above about 250 bar. In other embodiments, reaction mixture is maintained at temperature(s) of above about 350° C. and pressure(s) above about 300 bar.

It will be understood that in certain embodiments a solvent used in the methods of the present invention may be heated and pressurised beyond its critical temperature and/or beyond its critical pressure (i.e. beyond the 'critical point' of the solvent). Accordingly, the solvent may be a 'supercritical' solvent if heated and pressurised beyond the 'critical point' of the solvent.

In certain embodiments a solvent used in the methods of the present invention may be heated and pressurised to level(s) below its critical temperature and pressure (i.e. below the 'critical point' of the solvent). Accordingly, the solvent may be a 'subcritical' solvent if its maximum temperature and/or maximum pressure is below that of its 'critical point'. Preferably, the 'subcritical' solvent is heated and/or pressurised to level(s) approaching the 'critical point' of the solvent (e.g. between about 10° C. to about 50° C. below the critical temperature and/or between about 10 atmospheres to about 50 atmospheres below its critical pressure).

In some embodiments, a solvent used in the methods of the present invention may be heated and pressurised to levels both above and below its critical temperature and pressure (i.e. heated and/or pressurised both above and below the 'critical point' of the solvent at different times). Accordingly, the solvent may oscillate between 'subcritical' and 'supercritical' states when performing the methods.

Retention Time

The specific time period over which the conversion of organic matter feedstock may be achieved upon reaching a target temperature and pressure (i.e. the "retention time") may depend on a number different factors including, for example, the type of organic matter under treatment and the relative proportions of components in the reaction (e.g. the proportion of solvent, additive oil, catalyst additives, organic matter feedstock and/or any other additional component/s), the types of additive catalyst(s) utilised (if present), the retention time, and/or the type of apparatus in which the methods are performed. These and other factors may be varied in order to optimise a given method so as to maximise the yield and/or reduce the processing time. Preferably, the retention time is sufficient to convert all or substantially all of the organic material used as a feedstock into bio-product(s).

In certain embodiments, the retention time is less than about 60 minutes, 45 minutes, 30 minutes, 25 minutes, 20 minutes, 15 minutes, 10 minutes or less than about 5 minutes. In certain embodiments, the retention time is more than about 60 minutes, 45 minutes, 30 minutes, 25 minutes, 20 minutes, 15 minutes, 10 minutes or more than about 5 minutes. In other embodiments, the retention time is between about 1 minute and about 60 minutes. In additional embodiments, the retention time is between about 5 minutes and about 45 minutes, between about 5 minutes and about 35 minutes, between about 10 minutes and about 35 minutes, or between about 15 minutes and about 30 minutes. In further embodiments, the retention time is between about 20 minutes and about 30 minutes.

Persons skilled in the art will recognised that various catalyst additives as described herein (see sub-section below entitled "Catalysts") may be used to increase the efficiency of the treatment which may in turn reduce the retention time required to convert the organic matter into bio-product(s). Similarly, the retention time required will be influenced by the proportions of various components in the reaction mixture (e.g. water, oil additive, alcohol, solid substrates, catalyst additives etc).

The optimal retention time for a given set of reaction conditions as described herein may be readily determined by the skilled addressee by preparing and running a series of reactions that differ only by the retention time, and analysing the yield and/or quality of bio-product(s) produced.

Heating/Cooling, Pressurisation/De-Pressurisation

A reaction mixture (e.g. in the form of a slurry) comprising organic matter feedstock (e.g. lignocellulosic matter), solvent, and optionally one or more catalyst additives as defined herein may be brought to a target temperature and pressure (i.e. the temperature/pressure maintained for the "retention time") over a given time period.

Reaction mixes that do not contain a significant proportion of oil additive may require a very fast initial conversion to generate some solvent in-situ. However, the incorporation of oil into the reaction mixture as described herein allows the oil to act as a solvent thus alleviating the requirement for rapid heating/pressurisation.

In some embodiments, the reaction mix undergoes a separate pre-heating stage prior to reaching reaction temperature. The pre-heating stage may be performed on a feedstock slurry prior to the full reaction mix being formed. Alternatively the pre-heating stage may be performed on a slurry comprising all components of the reaction mixture. In some embodiments, the pre-heating stage raises the temperature of the feedstock slurry or reaction mixture to a maximum temperature of about: 120° C., 130° C., 140° C., 150° C., 160° C., 170° C., 180° C., 190° C., or 200° C. In other embodiments, the temperature is raised to less than about: 120° C., 130° C., 140° C., 150° C., 160° C., 170° C., 180° C., 190° C., or 200° C. In still other embodiments the temperature is raised to between about 100° C. and about 200° C., between about 100° C. and about 180° C., between about 100° C. and about 160° C., between about 120° C. and about 180° C., or between about 120° C. and about 160° C.

In continuous flow systems, pressure will generally change from atmospheric to target pressure during the time it takes to cross the pump (i.e. close to instantaneous) whereas in a batch system it will mirror the time that it takes to heat the mixture up.

In some embodiments, the reaction mixture may be brought to a target temperature and/or pressure in a time period of between about 30 seconds and about 30 minutes.

In some embodiments, the reaction mixture may be brought to a target temperature and/or pressure in a time period less than about 15 minutes, less than about 10 minutes, less than about 5 minutes, or less than about 2 minutes.

In certain embodiments, the reaction mixture may be brought to a target pressure substantially instantaneously and brought to a target temperature in less than about 20 minutes, less than about 10 minutes, or less than about 5 minutes. In other embodiments, the reaction mixture may be brought to a target pressure substantially instantaneously and brought to a target temperature in less than about two minutes. In other embodiments, the reaction mixture may be brought to a target pressure substantially instantaneously and brought to a target temperature in between about 1 and about 2 minutes.

Additionally or alternatively, following completion of the retention time period the product mixture generated may be cooled to between about 150° C. and about 200° C., between about 160° C. and about 200° C., preferably between about 170° C. and about 190° C., and more preferably about 180° C., in a time period of less than about 10 minutes, preferably less than about 7 minutes, more preferably less than about 6 minutes, preferably between about 4 and about 6 minutes, and more preferably about 5 minutes. Following the initial cooling period, the temperature may further reduced to ambient temperature with concurrent de-pressurisation by fast release into a cool aqueous medium (e.g. cooled water).

The processes of heating/pressurisation and cooling/de-pressurisation may be facilitated by performing the methods of the present invention in a continuous flow system (see section below entitled "Continuous flow").

Continuous Flow

Bio-product generation from organic matter feedstocks (e.g. lignocellulosic matter) using the methods of the present invention may be assisted by performing the methods under conditions of continuous flow.

Although the methods need not be performed under conditions of continuous flow, doing so may provide a number of advantageous effects. For example, continuous flow may facilitate the accelerated implementation and/or removal of heat and/or pressure applied to the slurry. This may assist in achieving the desired rates of mass and heat transfer, heating/cooling and/or pressurisation/de-pressurisation. Continuous flow may also allow the retention time to be tightly controlled. Without limitation to a particular mode of action, it is postulated that the increased speed of heating/cooling and/or pressurisation/de-pressurisation facilitated by continuous flow conditions along with the capacity to tightly regulate retention time assists in preventing the occurrence of undesirable side-reactions (e.g. polymerisation) as the slurry heats/pressurises and/or cools/de-pressurises. Continuous flow is also believed to enhance reactions responsible for conversion of organic matter to biofuel by virtue of generating mixing and shear forces believed to aid in emulsification which may be an important mechanism involved in the transport and "storage" of the oils generated away from the reactive surfaces of the feedstock as well as providing interface surface area for so-called 'on-water catalysis'.

Accordingly, in preferred embodiments the methods of the present invention are performed under conditions of continuous flow. As used herein, the term "continuous flow" refers to a process wherein organic matter feedstock mixed with a solvent in the form of a slurry (which may further comprise any one or more of a solid substrate, an oil additive and/or a catalyst additive) is subjected to:
 (a) heating and pressurisation to a target temperature and pressure,
 (b) treatment at target temperature(s) and pressure(s) for a defined time period (i.e. the "retention time"), and
 (c) cooling and de-pressurisation,
 while the slurry is maintained in a stream of continuous movement along the length (or partial length) of a given surface. It will be understood that "continuous flow" conditions as contemplated herein are defined by a starting point of heating and pressurisation (i.e. (a) above) and by an end point of cooling and de-pressurisation (i.e. (c) above).

Continuous flow conditions as contemplated herein imply no particular limitation regarding flow velocity of the slurry provided that it is maintained in a stream of continuous movement.

Preferably, the minimum (volume-independent) flow velocity of the slurry along a given surface exceeds the settling velocity of solid matter within the slurry (i.e. the terminal velocity at which a suspended particle having a density greater than the surrounding solution moves (by gravity) towards the bottom of the stream of slurry).

For example, the minimum flow velocity of the slurry may be above about 0.01 cm/s, above about 0.05 cm/s, preferably above about 0.5 cm/s and more preferably above about 1.5 cm/s. The upper flow velocity may be influenced by factors such as the volumetric flow rate and/or retention time. This in turn may be influenced by the components of a particular reactor apparatus utilised to maintain conditions of continuous flow.

Continuous flow conditions may be facilitated, for example, by performing the methods of the invention in a suitable reactor apparatus. A suitable reactor apparatus will generally comprise heating/cooling, pressurising/de-pressuring and reaction components in which a continuous stream of slurry is maintained.

The use of a suitable flow velocity (under conditions of continuous flow) may be advantageous in preventing scale-formation along the length of a particular surface that the slurry moves along (e.g. vessel walls of a reactor apparatus) and/or generating an effective mixing regime for efficient heat transfer into and within the slurry.

Bio-Products

The methods of the present invention may be used to produce bio-product(s) from organic matter feedstocks (e.g. lignocellulosic matter). The nature of the bio-product(s) may depend on a variety of different factors including, for example, the organic matter feedstock treated, and/or the reaction conditions/reagents utilised in the methods.

In certain embodiments, the bio-product(s) may comprise one or more biofuels (e.g. bio-oils, char products, gaseous products) and chemical products (e.g. platform chemicals, organic acids, furanics, furfural, hydroxymethylfurfural, levoglucosan, sorbitol, cylitol, arabinitol, formaldehyde, acetaldehyde).

In general, bio-product(s) produced in accordance with the methods of the present invention comprise or consist of a bio-oil. The bio-oil may comprise compounds including, but not limited to, any one or more of alkanes, alkenes, aldehydes, carboxylic acids, carbohydrates, phenols, furfurals, alcohols, and ketones. The bio-oil may comprise compounds including but not limited to aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-dihydroxybezenes, alkyl- and alkoxy-hydroquinones, indenes and indene-derivatives.

The bio-oil may comprise multiple phases, including but not limited to a water-soluble aqueous phase which may comprise, compounds including, but not limited to, any one or more of carbohydrates, aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy-dihydroxyhezenes, alkyl- and alkoxy-hydroquinones, indenes and indene-derivatives; and a water-insoluble phase which may comprise, compounds including, but not limited to, any one or more of waxes, aldehydes, carboxylic acids, carbohydrates, phenols, furfurals, alcohols, and ketones, resins and resin acids, and compounds structurally related to resin acids, alkanes and alkenes, fatty acids and fatty acid esters, sterols and sterol-related compounds, furanic oligomers, cyclopentanones, and cyclohexanones, alkyl- and alkoxy-cyclopentanones, and cyclohexanones, cyclopenteneones, alkyl- and alkoxy-cyclopentenones, aromatic compounds including naphthalenes and alkyl- and alkoxy-substituted naphthalenes, cresols, alkyl- and alkoxy-phenols, alkyl- and alkoxy-catechols, alkyl- and alkoxy dihydroxybezenes, alkyl- and alkoxy-hydroquinones, indenes and indene-derivatives.

Other non-limiting examples of the bio-products include oil char (e.g. carbon char with bound oils), char, and gaseous product (e.g. methane, hydrogen, carbon monoxide and/or carbon dioxide, ethane, ethene, propene, propane).

In some embodiments, a biofuel may be produced from organic matter comprising lignocellulosic matter. The biofuel may comprise a liquid phase comprising bio-oil.

Biofuels (e.g. bio-oils) produced in accordance with the methods of the invention may comprise a number of advantageous features, non-limiting examples of which include reduced oxygen content, increased hydrogen content, increased energy content and increased stability. In addition, bio-oils produced by the methods of the invention may comprise a single oil phase containing the liquefaction product. The product may be separated from the oil phase using, for example, centrifugation eliminating the need to evaporate large amounts of water.

A bio-oil bio-product produced in accordance with the methods of the invention may comprise an energy content of greater than about 25 MJ/kg, greater than about 30 MJ/kg, more preferably greater than about 32 MJ/kg, more preferably greater than about 35 MJ/kg, still more preferably greater than about 37 MJ/kg, 38 MJ/kg or 39 MJ/kg, and most preferably above about 41 MJ/kg. The bio-oil product may comprise less than about 15% wt db oxygen, preferably less than about 10% wt db oxygen, more preferably less than about 8% wt db oxygen and still more preferably less than about 7% wt db oxygen, and preferably less than about 5% wt db oxygen. The bio-oil product may comprise greater than about 6% wt db hydrogen, preferably greater than about 7% wt db hydrogen, more preferably greater than about 8% wt db hydrogen, and still more preferably greater than about 9% wt db hydrogen. The molar hydrogen:carbon ratio of a bio-oil of the invention may be less than about 1.5, less than about 1.4, less than about 1.3, or less than about 1.2.

A bio-oil produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, plant sterols, modified plant sterols, asphaltenes, pre-asphaltenes, and waxes.

A char or oil char bio-product produced in accordance with the methods of the invention may comprise an energy content of greater than about 20 MJ/kg, preferably greater than about 25 MJ/kg, more preferably greater than about 30 MJ/kg, and still more preferably greater than about 31 MJ/kg, 32 MJ/kg, 33 MJ/kg or 34 MJ/kg. The char or oil char product may comprise less than about 20% wt db oxygen, preferably less than about 15% wt db oxygen, more preferably less than about 10% wt db oxygen and still more preferably less than about 9% wt db oxygen. The char or oil char product may comprise greater than about 2% wt db hydrogen, preferably greater than about 3% wt db hydrogen, more preferably greater than about 4% wt db hydrogen, and still more preferably greater than about 5% wt db hydrogen. The molar hydrogen:carbon ratio of a char or oil char product of the invention may be less than about 1.0, less than about 0.9, less than about 0.8, less than about 0.7, or less than about 0.6.

An oil char bio-product produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, asphaltenes, pre-asphaltenes, and waxes.

A char bio-product (upgraded PCI equivalent coal) produced in accordance with the methods of the invention may comprise, for example, a mixture of amorphous and graphitic carbon with end groups partially oxygenated, giving rise to surface carboxy- and alkoxy groups as well as carbonyl and esters.

Bio-products produced in accordance with the methods of the present invention may comprise one or more biofuels (e.g. bio-oils, char products, gaseous products) and chemical products (e.g. platform chemicals, organic acids, furanics, furfural, hydroxymethylfurfural, levoglucosan, sorbitol, cylitol, arabinitol, formaldehyde, acetaldehyde).

Bio-products produced in accordance with the methods of the present invention may be cleaned and/or separated into individual components using standard techniques known in the art.

For example, solid and liquid phases of biofuel products (e.g. from the conversion of coal) may be filtered through a pressure filter press, or rotary vacuum drum filter in a first stage of solid and liquid separation. The solid product obtained may include a high carbon char with bound oils. In certain embodiments, the oil may be separated from the char, for example, by thermal distillation or by solvent extraction. The liquid product obtained may contain a low percentage of light oils, which may be concentrated and recovered though an evaporator.

Bio-products produced in accordance with the methods of the present invention may be used in any number of applications. For example, biofuels may be blended with other fuels, including for example, ethanol, diesel and the like. Additionally or alternatively, the biofuels may be upgraded into higher fuel products. Additionally or alternatively, the biofuels may be used directly, for example, as petroleum products and the like.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

EXAMPLES

The invention will now be described with reference to specific examples, which should not be construed as in any way limiting Example 1: Exemplary Conversion of Organic Matter to a Synthetic Crude Oil and Additional Chemical Products in the Presence of a Solid Substrate: Comparison with Conversion in Absence of Solid Substrate (i) Slurry Preparation Pre-ground feedstock (radiata pine biomass containing about 10-20 wt % water) was slurried with water in an agitated slurrying tank both with and without solid substrate. The solid substrate was either lignite (containing about 30-50% water) or activated carbon. For Run 10 the organic matter was bana grass and the solid substrate was a mixture of lignite and iron oxide powder (haematite powder).

The particle size of the radiata pine organic matter was 0.15 mm-2 mm. The particle size of the solid substrate was <2 mm.

The mixing proportions of the materials used in the series of experiments are given in Table 2 below.

An additional oil component was not added for this series of experiments. As the organic matter liquefies within a matter of seconds upon being raised to reaction temperature it is considered that there is an oil phase present within the reactor even in the runs where no added oil solvent component is used, particularly for organic matter concentrations in the slurry greater than 5 w/w.

(ii) Heating and Pressurisation

A high-pressure pump was fed by the slurrying tank to deliver the slurry to heating section at pressures ranges as shown in Table 3 below. Heating of the slurry can be performed in several ways, for example, by a counter or co-current heat exchange system and/or by immersion of the heating section in a hot fluidized bed. Alternatively, the slurry can be heated in a ballistic fashion by the intersection of the slurry in the heating section with an oil or water stream heated, for example, in the range of 400-720 degrees Celsius (see, for example, Australian provisional patent application number 2010902938 entitled "Ballistic heating process", the entire contents of which are incorporated herein by reference). In all cases, the target slurry temperature was in the range of 250-350 degrees Celsius (centigrade) upon entering the reactor. In certain cases, one or more catalysts incorporated into the slurry prior to entry into the reactor.

In the particular experiments exemplified here the slurry was pre-heated by means of a counterflow heat exchanger to about 150 C and then further heated by mixing with an incident stream of supercritical steam to about 320-360 C before entering the reactor.

(iii) Conversion Reaction

The slurry was fed into the reactor (which can either have a vertical or horizontal orientation) under conditions of

TABLE 2

Examples of Slurry Compositions

| Run No. | Organic Matter type | Solid substrate type | Aqueous solvent type | Oil solvent type | Organic matter % in slurry | Solid substrate % in slurry | Aqueous solvent % in slurry | Oil solvent % in slurry | Added Catalyst type | Added catalyst % of dry matter in slurry |
|---|---|---|---|---|---|---|---|---|---|---|
| 1 | Radiata pine | None | Water | — | 12.2 | — | 87.8 | — | NaOH | 14.2 |
| 2 | Radiata pine | None | Water | — | 12.2 | — | 87.8 | — | NaOH | 7.2 |
| 3 | Radiata pine | None | Water | — | 15 | — | 85 | — | NaOH | 8.0 |
| 4 | Radiata pine | Lignite | Water | — | 4 | 4 | 92 | — | NaOH | 12 |
| 5 | Radiata pine | Lignite | Water | — | 7 | 3 | 90 | — | NaOH | 10 |
| 6 | Radiata pine | Activated Carbon | Water | — | 9 | 3 | 88 | — | NaOH | 10 |
| 7 | Radiata pine | Lignite | Water | — | 7.8 | 4.7 | 87.5 | — | NaOH | 9 |
| 8 | Radiata pine | Lignite | Water | — | 9.8 | 6 | 84.2 | — | NaOH | 9 |
| 9 | Radiata pine | Lignite | Water | — | 12 | 1.7 | 86.3 | — | NaOH | 11 |
| 10 | Bana grass | Lignite plus iron oxide (haematite) | Water | — | 6 | 20 lignite 0.5 haematite | 83.5 | — | — | — | continuous flow with the reacting slurry being kept at a constant temperature and pressure inside the ranges as shown in Table 3 below.

The residence time at the reaction temperature was held to the range of 15-30 min. dependent on feedstock and catalyst/s applied. As the reaction is mildly endothermic (3-5 MJ/kg of product) only a small amount of trim heating was necessary.

This experimental observation means that little restriction exists to the diameter of the reactor tube as it does not need to be heated substantially; the thermal mass and lagging the reactor sufficed. Another major positive factor related to scaling the system and keeping the reactor length to a minimum.

Catalyst was added as an aqueous solution between the heating step and the reactor.

TABLE 3

Examples of Process Conditions

| Run No. | Organic Matter type | Solid substrate type | Aqueous solvent type | Reactor temperature range (C.) | Pressure Range (Bar) | Residence time in Minutes | Pre-heater temperature (C.) |
|---|---|---|---|---|---|---|---|
| 1 | Radiata pine | None | Water | 320-360 | 220-260 | 20-30 | 120-160 |
| 2 | Radiata pine | None | Water | 320-360 | 220-260 | 20-30 | 120-160 |
| 3 | Radiata pine | None | Water | 320-360 | 220-260 | 20-30 | 120-160 |
| 4 | Radiata pine | Lignite | Water | 320-360 | 220-260 | 20-30 | 120-160 |
| 5 | Radiata pine | Lignite | Water | 320-360 | 220-260 | 20-30 | 120-160 |
| 6 | Radiata pine | Activated Carbon | Water | 320-360 | 220-260 | 20-30 | 120-160 |
| 7 | Radiata pine | Lignite | Water | 320-360 | 220-260 | 20-30 | 120-160 |
| 8 | Radiata pine | Lignite | Water | 320-360 | 220-260 | 20-30 | 120-160 |
| 9 | Radiata pine | Lignite | Water | 320-360 | 220-260 | 20-30 | 120-160 |
| 10 | Bana Grass | Lignite plus iron oxide | Water | 320-360 | 220-260 | 20-30 | n/a |

(iv) Cooling and Pressure Let-Down

At the end of the set residence time the product stream may optionally be passed through a heat exchanger with an exit temperature in the range of 50-180 degrees Celsius (at which stage reaction rates slow substantially), this final set temperature being feedstock dependent. Alternatively and as exemplified here the pressure is let down to atmospheric pressure by one or more depressurisation steps. Specifically the reacted mixture was depressurized by passing through a selectable capillary system to either approximately 20 bar and then to atmospheric pressure or directly to atmospheric pressure. The exit of the capillary tube may be immersed in water or another liquid. The pressure let-down system was used to generate the back-pressure in the reactor and heating system allowing a continuous flow reaction to be achieved at a constant pressure and temperature steady state. A suitable pressure let down system is described, for example, in United States of America patent publication no. 2012-0227822 A1 entitled "Assembly for reducing slurry pressure in a slurry processing system", the entire contents of which are incorporated herein by reference.

(v) Results

In each case a water insoluble product separates from the aqueous phase on cooling. The water insoluble product may be a liquid or a viscous melt depending upon the ambient temperature and upon whether or not it contains solid substrate and whether or not oil was used in the solvent phase. Products containing solid substrate may be a glassy solid resembling pitch at ambient temperatures.

In each case the aqueous phase contains water soluble organic compounds.

It was observed that in the case where the no solid substrate was added to the slurry feed, the pressure drop across the reactor, as measured by the difference between a pressure gauge located before the reactor and a pressure gauge located after the reactor but before the cooling or depressurisation steps, increased substantially with run duration, possibly an indication of partial blockages developing inside the reactor. In contrast, where a solid substrate is added the pressure drop developed over the reactor is negligible and does not increase over time.

Figure 2:
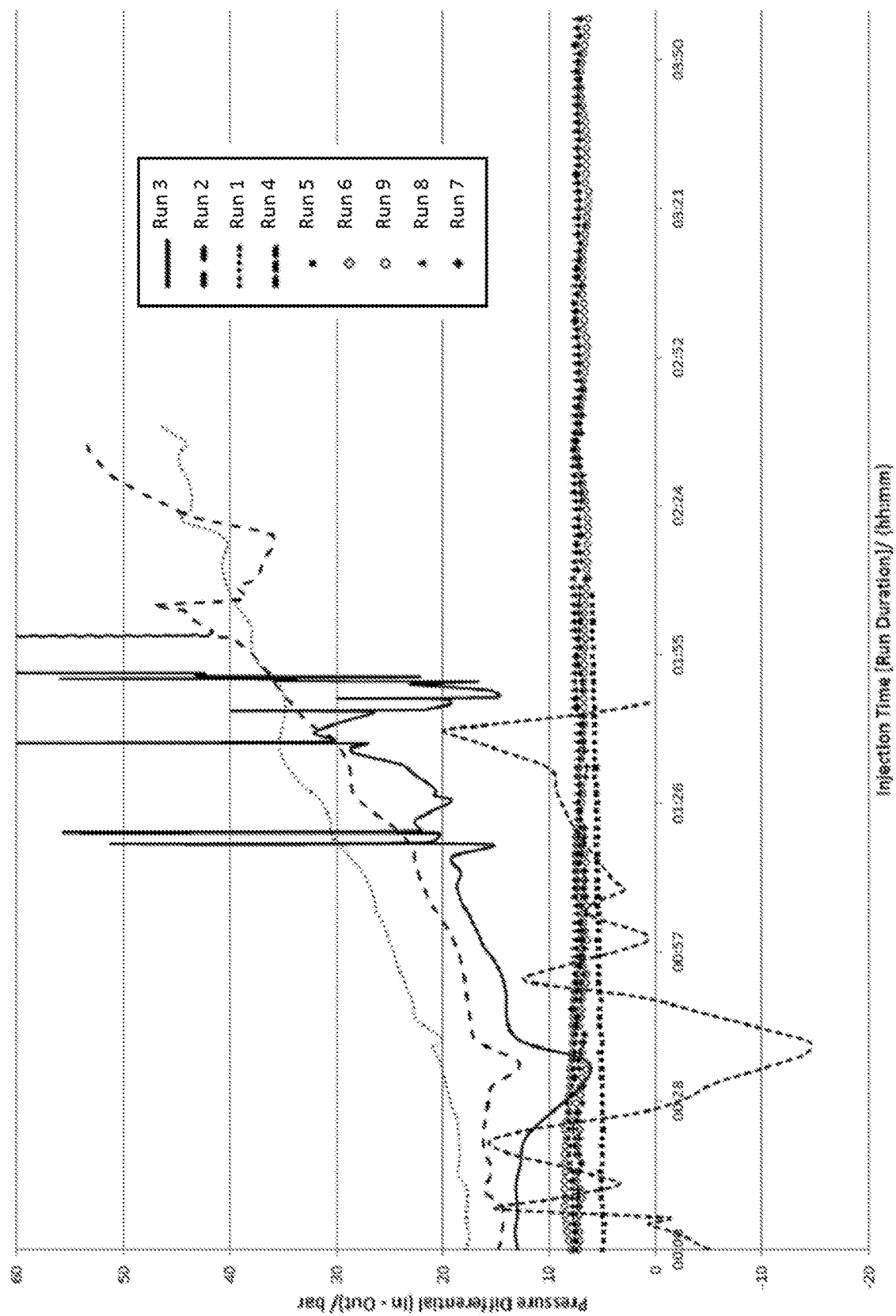
FIG. 2 is a graph showing measured pressure difference across reactor (pressure in-pressure out) versus experimental duration for experiments without (Runs 1-3) and with (Runs 4-9) solid substrate added to reaction mixture containing organic matter.

The pressure drops across the reactor recorded in a series of experiments with and without added solid substrate are shown in FIG. 2 and FIG. 4.

It is a key feature of the present invention that it allows for the reaction of high concentrations of organic matter in large-scale continuous reactors without the need for the design of elaborate reactor profiles at significantly higher cost.

For example it is possible that long straight tubular reactor without any profile changes could also overcome the development of a pressure drop across the reactor, however such a reactor would need to be about 18 metres long in order to achieve the same residence time as three 6 metre reactors linked in series. Since a preferable configuration for many applications, in terms of reactor fabrication and arrangement to occupy a minimum footprint area, is three vertically mounted 6 metre tubes linked in series by narrow radius bends as opposed to an 18 metre tube mounted in either horizontal or vertical configuration, the current invention leads to significant CapEx savings in the design of a commercial scale plant for the conversion of organic matter, especially in relation to lignocellulosic biomass.

(vi) Nature of Products from Process Depending on the nature of the solid substrate employed, the solid substrate may be completely inert under reaction conditions and be substantially unchanged, or it may act as a catalyst to assist in the transformation of the organic matter to products, or it may partially react and partially contribute to the formation of products of the process, or a combination of each may occur.

Without limitation to a particular mode of action substrates such as activated carbon may, under the conditions described in this invention catalyse the conversion of organic matter to products containing less oxygen by facilitating decarboxylation reactions. (See for example Activated Carbons for Hydrothermal Decarboxylation of Fatty Acids, Jie Fu, Fan Shi, L. T. Thompson, Jr., Xiuyang Lu, and Phillip E. Savage, ACS Catal., 2011, 1 (3), pp 227-231)

Where a solid substrate is employed it may be recovered from the process intimately mixed with water-insoluble fuel and chemical products. Alternatively and preferably the solid substrate is separated from the water-insoluble fuel and chemical products before or immediately after the depressurisation step by means of a hydrocyclone, centrifuge, decanter, filter or other means of physical separation. In that case the solid substrate is most preferably recycled into the process by slurrying with fresh organic matter being fed to the process.

Alternatively liquid products are partially separated from the solid substrate before or immediately after the depressurisation step by means of a hydrocyclone, centrifuge, decanter, filter or other means of physical separation. In that case the liquid products are most preferably taken off as a product stream and the solid substrate mixed with some liquid products is preferably recycled into the process by slurrying with fresh organic matter being fed to the process.

Alternatively fuel and chemical products are separated from solid substrate in a separate processing step for example by distillation or by extraction with a solvent. In that case the extracted fuel or chemical products that may be liquids or solids are taken off as a product stream and the residue, being the solid substrate is preferably recycled into the process by slurrying with fresh organic matter being fed to the process.

In all cases solid substrate that is excess to requirements for recycling into the process constitutes an additional product, for instance a solid fuel, a coking or PCI coal, a precursor to activated carbon.

Certain properties of the water-insoluble products from the runs exemplified are shown in Tables 4 and 5.

In the case of the examples containing a solid substrate the properties labelled "Solid Substrate . . . Initial" are those corresponding to the solid substrate as mixed into the reaction mixture or slurry before passing through the reactor. The properties labelled "Mixed Solid Substrate & Oil Product" are those of the mixture of solid substrate and water-insoluble product oil after passing through the reaction and cooling and depressurization steps. The properties labelled "Separated oil Product" are those properties of the water-insoluble oil product after separation from the solid substrate. The properties labelled 'Recovered Solid substrate/ solid product" are the properties of the residual solid material after removal of the oil product. This material can be recycled after, if necessary, crushing or milling to a suitable particle size, as solid substrate to be combined with new organic matter entering the process.

Without limitation, the means used to separate the oil products from the solid substrate in these example were: solvent extraction with acetone or tetrahydofuran solvents; vacuum distillation or vacuum sublimation; distillation including partially-pyrrolitic distillation under a flow of inert gas or vapour, for example steam and/or nitrogen or argon.

Figure 3:
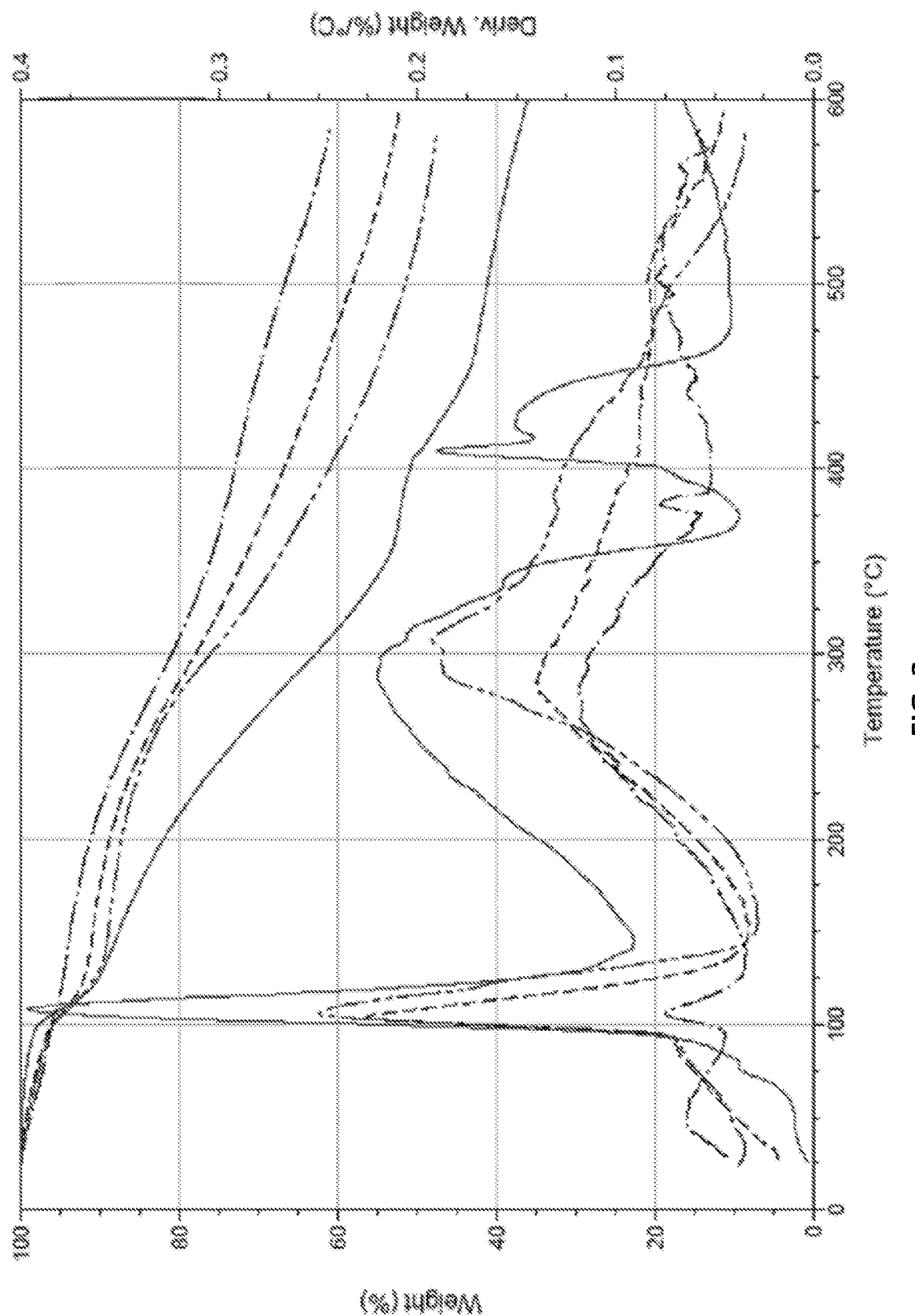
FIG. 3 is a graph showing TGA curves (weight loss from sample versus temperature) for samples of mixed solid substrate and oil product from runs 5, 6 and 7. Key: Upper graphs—weight % versus temperature (left hand axis). Lower graphs—derivative of weight loss w.r.t temperature (right hand axis). Solid line, Run 6. Dashed line ( - - - ) and Dash-dot (_._.) line, Run 5, Dash dot dot (_.._..) line, Run 7.
Figure 4A:
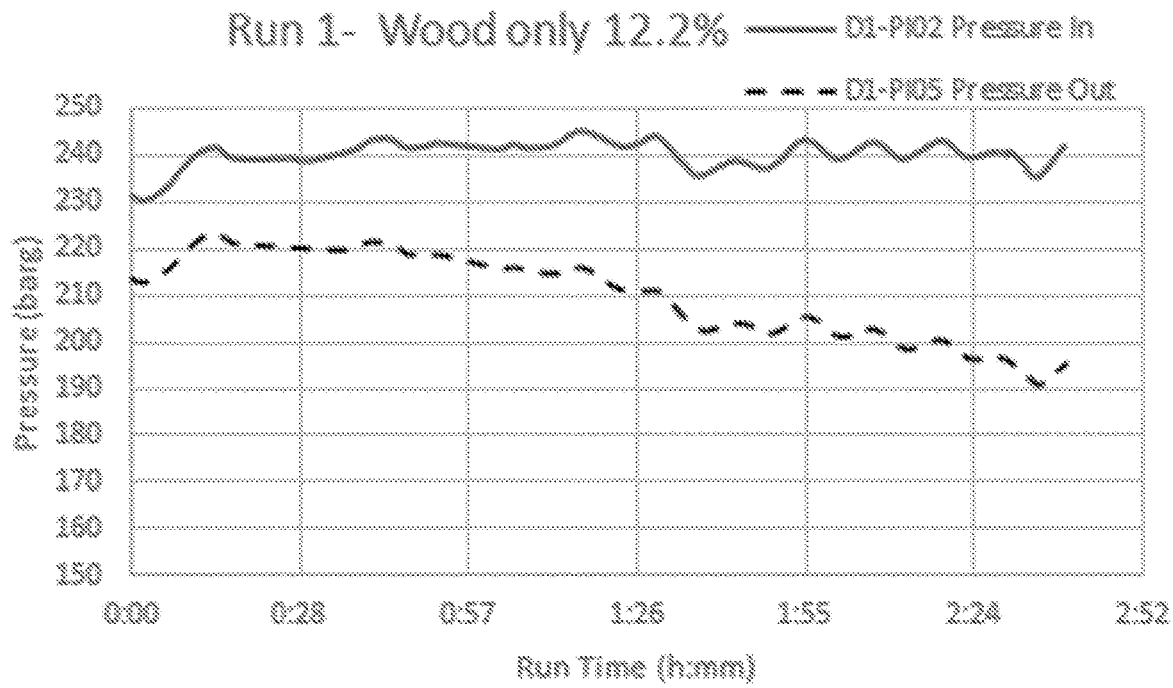
FIGS. 4A-4E are representative graphs showing gauge pressure near the start of the reactor (pressure in) and near the end of the reactor (pressure out) versus experimental duration for experiments with and without solid substrate added to reaction mixture containing organic matter.
Figure 4B:
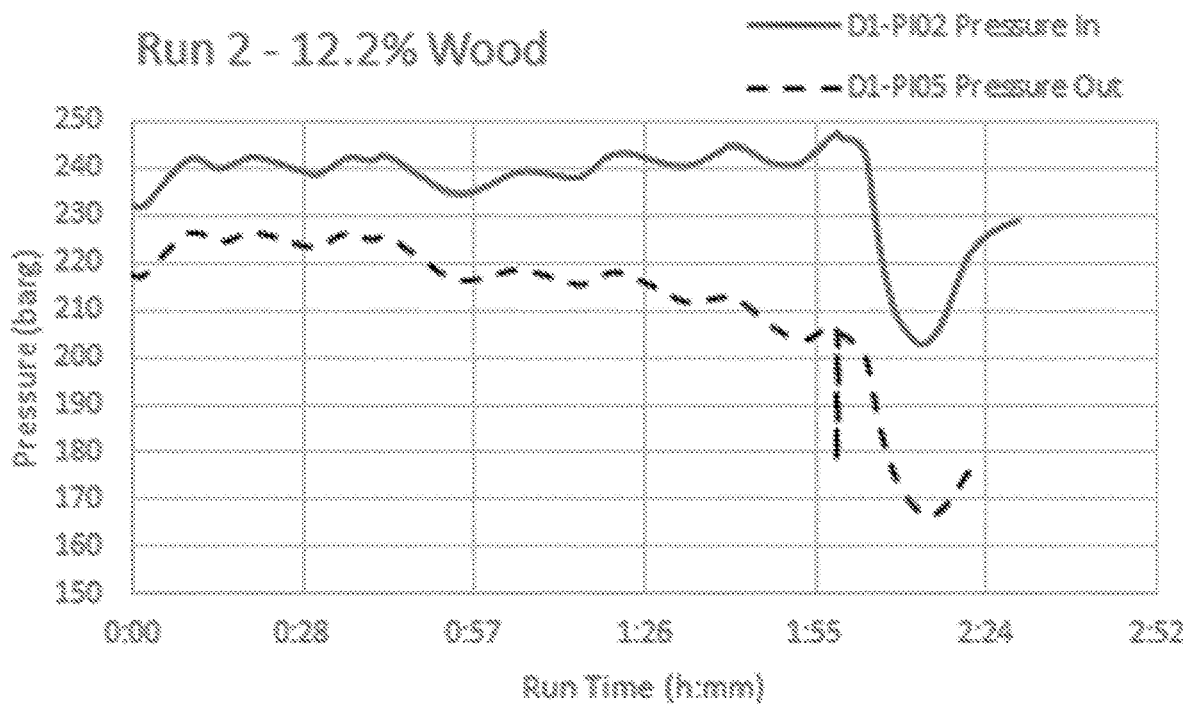
Figure 4C:
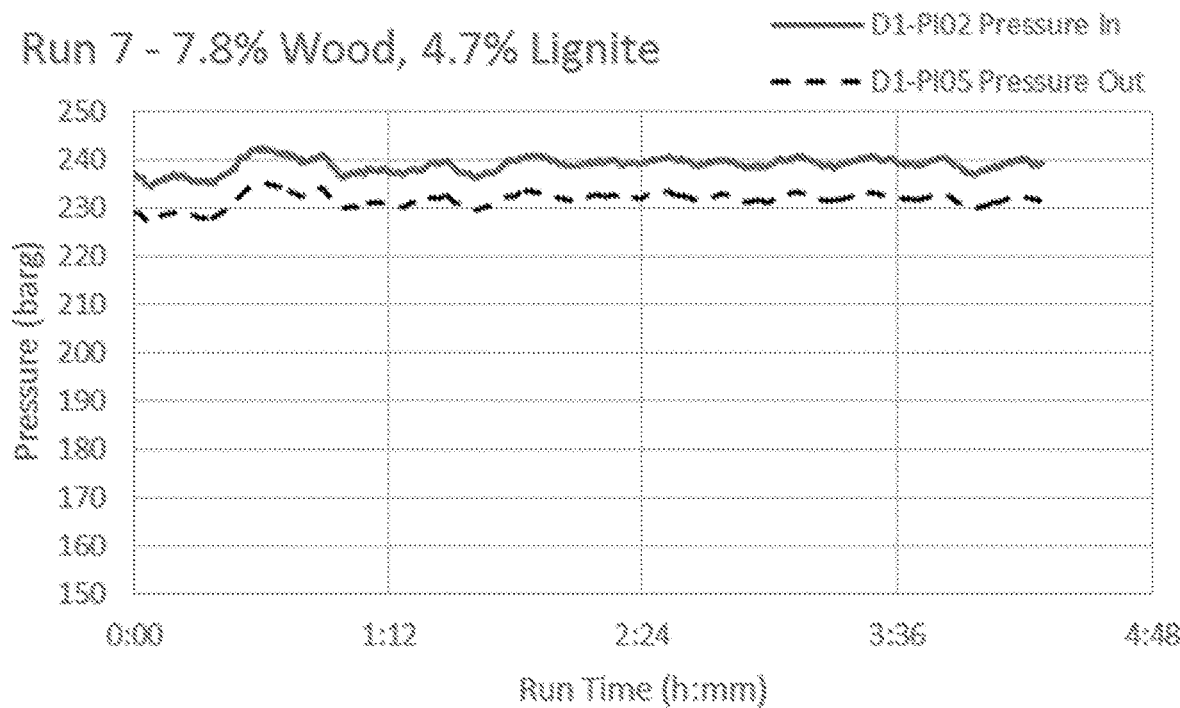
Figure 4D:
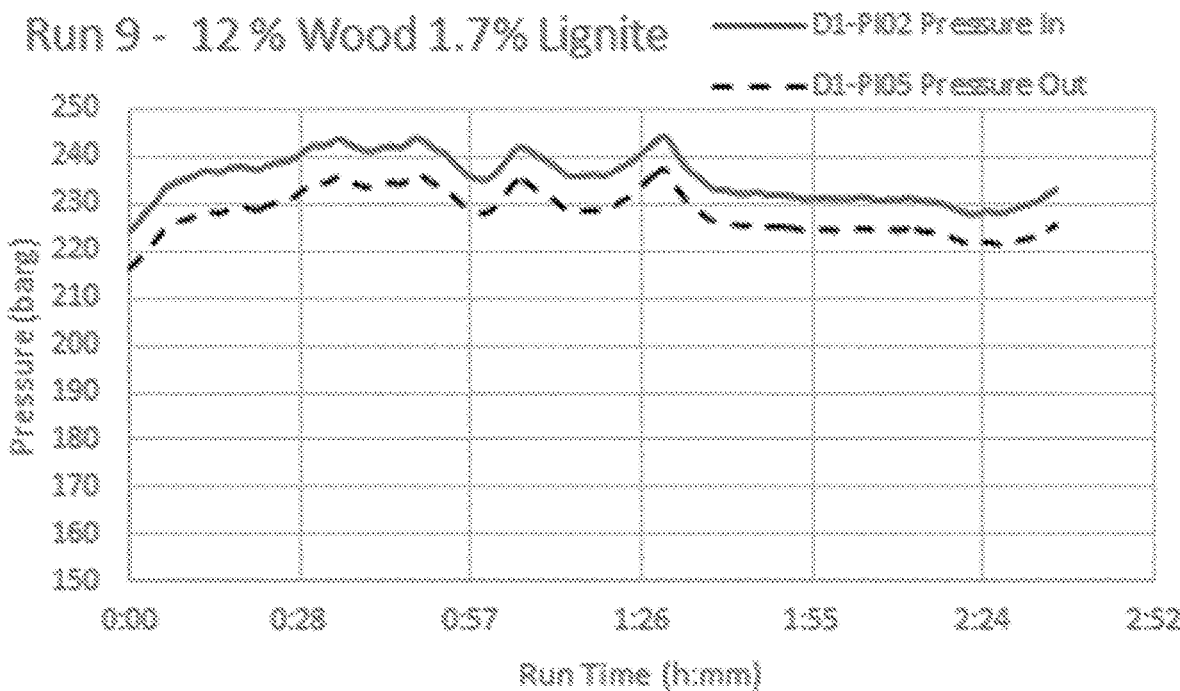
Figure 4E:
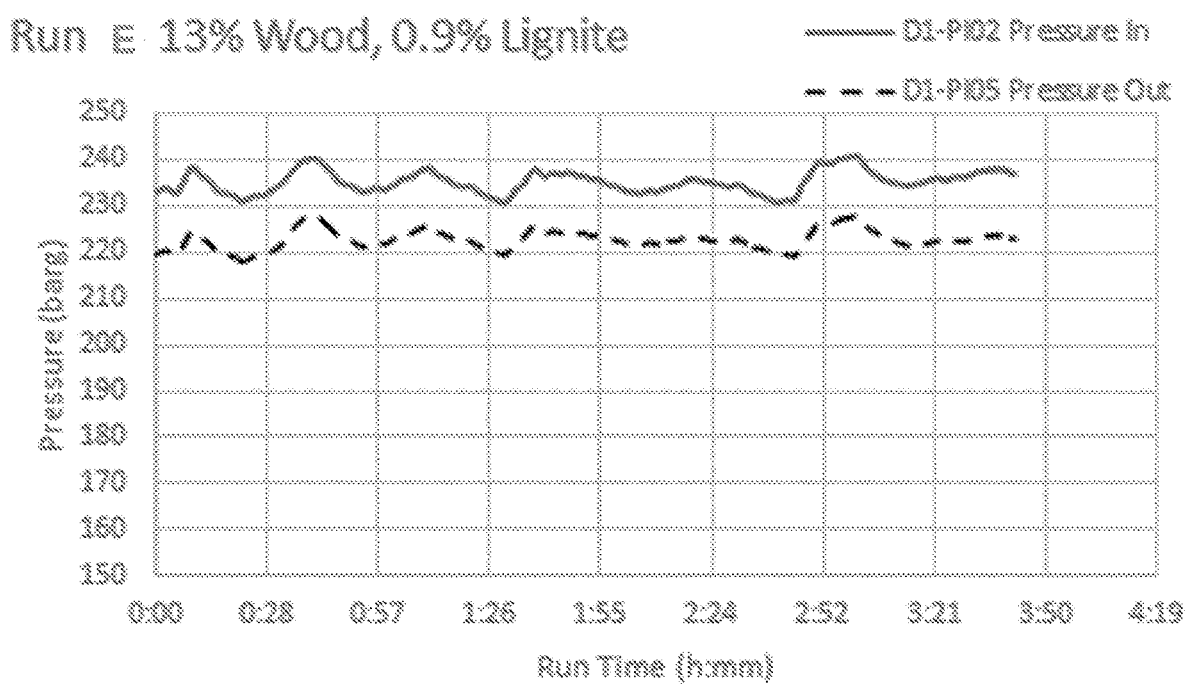

The thermal separation of the products from the solid substrate is exemplified by thermogravimetric analysis (TGA) of the products under nitrogen atmosphere. FIG. 3 shows the weight loss versus temperature for samples of Mixed Solid Substrate & Oil Product from runs 5 (two samples), 6, and 7. The data illustrate that up to 50% by mass of the samples in question may be volatilized up to temperatures of 400° C.

TABLE 4

Properties of the water-insoluble products from the runs exemplified.

| Run No. | Organic Matter type | Solid substrate type | Organic matter GCV (MJ/kg dry basis) | Solid Substrate GCV initial (MJ/kg dry basis) | Mixed Solid Substrate & Oil Product GCV (MJ/kg dry basis) | Separated oil Product GCV (MJ/kg dry basis) | Recovered Solid substrate/solid product GCV (MJ/kg dry basis) |
|---|---|---|---|---|---|---|---|
| 1 | Radiata pine | None | 21 | n/a | n/a | 34 | |
| 2 | Radiata pine | None | 21 | n/a | n/a | 34 | |
| 3 | Radiata pine | None | 21 | n/a | n/a | 34 | |
| 4 | Radiata pine | Lignite | 21 | 25 | — | 37 | 27 |
| 5 | Radiata pine | Lignite | 21 | 25 | 30.6 | 36 | 31.7 |
| 6 | Radiata pine | Activated Carbon | 21 | 30.5 | 33.4 | 33.5 | 29.3 |
| 7 | Radiata pine | Lignite | 21 | 25 | — | 36.3 | |
| 8 | Radiata pine | Lignite | 21 | 25 | — | — | |

TABLE 4-continued

Properties of the water-insoluble products from the runs exemplified.

| Run No. | Organic Matter type | Solid substrate type | Organic matter GCV (MJ/kg dry basis) | Solid Substrate GCV initial (MJ/kg dry basis) | Mixed Solid Substrate & Oil Product GCV (MJ/kg dry basis) | Separated oil Product GCV (MJ/kg dry basis) | Recovered Solid substrate/solid product GCV (MJ/kg dry basis) |
|---|---|---|---|---|---|---|---|
| 9 | Radiata pine | Lignite | 21 | 25 | — | — | |
| 10 | Bana Grass | Lignite plus iron oxide | 18.5 | 25 | 28.3 | 38.3 | 26.10 |

TABLE 5

Examples of Water-insoluble Product Properties

| Run No. | Organic Matter type | Solid substrate type | Ultimate analysis of Separated Oil product dry basis | | | | | | Ultimate analysis of recovered substrate/solid product dry basis | | | | | |
|---|---|---|---|---|---|---|---|---|---|---|---|---|---|---|
| | | | % C | % H | % N | % S | % Ash | % O | % C | % H | % N | % S | % Ash | % O |
| 1 | Radiata pine | None | 79.8 | 6.62 | | | 1.5 | 12 | | | | | | |
| 2 | Radiata pine | None | 78.2 | 7.01 | | | 0.4 | 14.1 | | | | | | |
| 3 | Radiata pine | None | 78 | 7.02 | | | 0.18 | 14.7 | | | | | | |
| 4 | Radiata pine | Lignite | 80.1 | 8.4 | 0.18 | | 0.29 | 10.3 | 72.96 | 4.30 | 0.40 | | 5.74 | 16.40 |
| 5 | Radiata pine | Lignite | | | | | | | | | | | | |
| 6 | Radiata pine | Activated Carbon | 75.8 | 7.33 | 0.58 | | 0.18 | 16.1 | 73.23 | 3.54 | 0.91 | | 7.12 | 15.20 |
| 7 | Radiata pine | Lignite | | | | | | | | | | | | |
| 8 | Radiata pine | Lignite | | | | | | | | | | | | |
| 9 | Radiata pine | Lignite | | | | | | | | | | | | |
| 10 | Bana Grass | Lignite plus iron oxide | 83.47 | 8.90 | 0.28 | 0.17 | 0.02 | 7.16 | 74.5 | 3.90 | 0.85 | 0.26 | 7.2 | 13.3 |

(vii) Composition of Products

The water-soluble and water-insoluble products from the reaction are complex mixtures of organic compounds. Listed in Table 6 below are a number of components identified in the water-soluble and water-insoluble phases of the products, where the organic matter comprised radiata pine. Most of the components are common to both water-soluble and water-insoluble phases.

TABLE 6

Components identified in the water-soluble and water-insoluble phases of the products

| Compound |
|---|
| 2-methyl-2-cyclopentene-1-one |
| 3-methyl-2-cyclopentene-1-one |
| 3,4-dimethyl-2-cyclopentene-1-one |
| 2,3-dimethyl-2-cyclopentene-1-one |
| 2,3,4-trimethyl-2-cyclopentene-1-one |
| 3-ethyl-2-cyclopentene-1-one |
| m-Guaiacol (Mequinol) |
| 3-Methylguaiacol |
| 4-Methylguaiacol |
| 4-Ethylguaiacol |
| 4-Propylguaiacol (Dihydroeugenol) |
| 4-Vinylguaiacol |
| Eugenol (4-Allylguaiacol) |
| Isoeugenol (4-Propenylguaiacol) |
| Vanillin (4-hydroxy-3-methoxy-benzaldehyde) |

TABLE 6-continued

Components identified in the water-soluble and water-insoluble phases of the products

| |
|---|
| Homovanillyl alcohol (4-hydroxy-3-methoxy-phenylethanol) |
| Homovanillic acid (4-Hydroxy-3-methoxy-phenylacetic acid) |
| Phenol |
| o-Cresol |
| m-Cresol |
| p-Cresol |
| 2-Ethylphenol |
| 3-Ethylphenol |
| 4-Ethylphenol |
| 2,3-dimethyl-phenol |
| 2,3,6-trimethyl-phenol |
| 4-Propylphenol |
| Pyrocatechol |
| Hydroquinone |
| 3-Methyl-catechol |
| 4-Methyl-catechol |
| 2-Methyl-Hydroquinone |
| 2,3-Dimethyl-Hydroquinone |
| 2,5-Dimethyl-Hydroquinone |
| 2,6-Dimethyl-Hydroquinone |
| 4-Ethyl-catechol |
| 4-Ethyl-1,3-Benzenediol |
| 4-propyl-1,3-Benzenediol |
| 1-Butanol |
| 4-Hydroxy-acetophenone |
| 4-Hydroxy-2-methylacetophenone |
| 4-Hydroxy-1-indanone |

TABLE 6-continued

Components identified in the water-soluble and water-insoluble phases of the products Abietic acid/Pimaric acid
Cyclopentanone
3-Methyl-1-hexene
3-Methylcyclopentanone
2-Octene
3-Ethyl-cyclopentanone
Giberrelic acid
2,3-dihydro-1H-Inden-1-one
2,3-dihydro-2-methyl-1H-Inden-1-one
2,3-dihydro-1H-Inden-5-ol
1-Methylindan-2-one
7-Methylindan-1-one
Oleic acid
9-Octadecenoic acid (Z)-, methyl ester
1,2,3,4-tetrahydro-5,7-dimethyl-Naphthalene
4-methyl-1-Naphthalenol
Androstan derivatives
2-Isopropyl-10-methylphenanthrene
Tetracosane C24H50
Tetratriacontane C34H70
Hexatriacontane C36H74
Methanol
Ethanol
Acetone (viii) Discussion It is clear from the preceding examples that the addition of a solid substrate inhibits the build-up over time of a pressure difference across a tube-like reactor under continuous flow conditions. The solid substrate does not detract from the calorific value of the bio-products obtained, but in fact provides significant enhancement. Oil bio-products may be separated from the substrate by a variety of physical methods. The residual substrate may be recycled into the process or if not required for that purpose it represents a solid bio-product.

Example 2: Further Exemplary Conversion of Organic Matter to a Synthetic Crude Oil and Additional Chemical Products in the Presence of a Solid Substrate (i) Slurry Preparation Pre-ground feedstock (radiata pine biomass containing about 10-20 wt % water) was slurried with water in an agitated slurrying tank with solid substrate. The solid substrate was either lignite or activated carbon.

The mixing proportions of the materials used in the series of experiments are given in Table 7 below.

(ii) Heating and Pressurisation

Samples were pre-heated and a high-pressure pump was fed by the slurrying tank to deliver the slurry to the main part of the reactor. Heating of the slurry can be performed in several ways, for example, by a counter or co-current heat exchange system and/or by immersion of the heating section in a hot fluidized bed. Alternatively, the slurry can be heated in a ballistic fashion by the intersection of the slurry in the heating section with an oil or water stream (e.g. supercritical steam) (see, for example, United States of America patent publication no. 2013-0205652 A1 entitled "Ballistic heating process", the entire contents of which are incorporated herein by reference).

In all cases, the target slurry temperature was in the range of 250-350° C. upon entering the reactor. In certain cases, one or more catalysts incorporated into the slurry prior to entry into the reactor. In the particular experiments exemplified here the slurry was pre-heated by means of a counterflow heat exchanger to about 150° C. and then further heated by mixing with an incident stream of supercritical steam to about 320-360° C. before entering the reactor.

(iii) Conversion Reaction

The slurry was fed into the reactor (which can either have a vertical or horizontal orientation) under conditions of continuous flow with the reacting slurry being kept at a constant temperature and pressure inside the ranges as shown in Table 8 below. The residence time at the reaction conditions is also shown in Table 8.

Catalyst was added as an aqueous solution after contact with the supercritical steam prior to the heated and pressurised slurry entering the reactor.

(iv) Cooling and Pressure Let-Down

At the end of the set residence time the product stream may optionally be passed through a heat exchanger with an exit temperature in the range of 50-180 degrees Celsius (at which stage reaction rates slow substantially), this final set temperature being feedstock dependent. Alternatively and as exemplified here the pressure is let down to atmospheric pressure by one or more depressurisation steps. Specifically the reacted mixture was depressurized by passing through a selectable capillary system to either approximately 20 bar and then to atmospheric pressure or directly to atmospheric pressure. The exit of the capillary tube may be immersed in water or another liquid. The pressure let-down system was used to generate the back-pressure in the reactor and heating system allowing a continuous flow reaction to be achieved at a constant pressure and temperature steady state. A suitable pressure let down system is described, for example, in United States of America patent publication no. 2012-0227822 A1 entitled "Assembly for reducing slurry pressure in a slurry processing system", the entire contents of which are incorporated herein by reference.

(v) Product Analysis

Certain properties of the water-insoluble products from the runs exemplified are shown in Tables 9 and 10. Without limitation, the means used to separate the oil products from the solid substrate in these examples were: solvent extraction with acetone or tetrahydrofuran solvents; vacuum distillation or vacuum sublimation; distillation including partially-pyrolitic distillation under a flow of inert gas or vapour (e.g. steam and/or nitrogen or argon).

TABLE 7

Slurry Compositions (A-J) Prepared for Processing

| Run No. | Percentage of Total Solids in Slurry | Feedstock Type/Percentage | Solid Substrate Type/Percentage | Added Catalyst Type/Amount | Particle size | Aqueous Solvent Type |
|---|---|---|---|---|---|---|
| A | ≈10 wt % dry basis in slurry | Radiata pine ≈7 wt % of total dry solids in slurry | Lignite (coal powder) ≈3 wt % of total dry solids in slurry | NaOH ≈10% ratio (0.1:1) of total solids in slurry | Radiata pine ≈500 ☐M Lignite ≈<1 mm, sieved | Water |
| B | ≈15 wt % dry basis in slurry | Radiata pine ≈9 wt % of total dry solids in slurry | Carbon (activated) ≈6 wt % of total dry solids in slurry | NaOH ≈15% ratio (0.15:1) of total solids in slurry | Radiata pine ≈500 ☐M Lignite ≈<1 mm, sieved | Water |
| C | ≈15 wt % dry basis in slurry | Radiata pine ≈8.5 wt % of total dry solids in slurry | Lignite ≈7.5 wt % of total dry solids in slurry | NaOH ≈15% ratio (0.15:1) of total solids in slurry | Radiata pine ≈500 ☐M Lignite ≈<1 mm, sieved | Water |
| D | ≈14 wt % dry basis in slurry | Radiata pine ≈12 wt % of total dry solids in slurry | Lignite ≈1.7 wt % of total dry solids in slurry | NaOH ≈14% ratio (0.14:1) of total solids in slurry | Radiata pine ≈500 ☐M Lignite ≈<1 mm, sieved | Water |
| E | ≈14 wt % dry basis in slurry | Radiata pine ≈13 wt % of total dry solids in slurry | Lignite ≈0.9 wt % of total dry solids in slurry | NaOH ≈14% ratio (0.14:1) of total solids in slurry | Radiata pine ≈500 ☐M Lignite ≈<1 mm, sieved | Water |
| F | ≈15 wt % dry basis in slurry | Radiata pine ≈9.8 wt % of total dry solids in slurry | Lignite ≈6 wt % of total dry solids in slurry | NaOH ≈15% ratio (0.15:1) of total solids in slurry | Radiata pine ≈500 ☐M Lignite ≈<1 mm, sieved | Water |
| G | ≈14 wt % dry basis in slurry | Radiata pine ≈10 wt % of total dry solids in slurry | Lignite ≈3 wt % of total dry solids in slurry | NaOH ≈14% ratio (0.14:1) of total solids in slurry | Radiata pine ≈500 ☐M Lignite ≈<1 mm, sieved | Water |
| H | ≈9 wt % dry basis in slurry | Radiata pine ≈9 wt % of total dry solids in slurry | Lignite ≈1.6 wt % of total dry solids in slurry | NaOH ≈9% ratio (0.09:1) of total solids in slurry | Radiata pine ≈500 ☐M Lignite ≈<1 mm, sieved | Water |
| I | ≈14 wt % dry basis in slurry | Radiata pine ≈12 wt % of total dry solids in slurry | Lignite ≈2 wt % of total dry solids in slurry | NaOH ≈14% ratio (0.14:1) of total solids in slurry | Radiata pine ≈500 ☐M Lignite ≈<1 mm, sieved | Water |
| J | ≈14 wt % dry basis in slurry | Radiata pine ≈12 wt % in slurry) | Lignite ≈2 wt % of total dry solids in slurry) | NaOH ≈14% ratio (0.14:1) of total solids in slurry | Radiata pine ≈500 ☐M Lignite ≈<1 mm, sieved | Water |

NOTES:
≈approximately

TABLE 8

Conditions for processing slurry compositions (A-J)

| Run No. | Reactor temperature Range (° C.) | Reactor pressure range (Bar) | Residence time (mins) | Preheater Temperature (° C.) |
|---|---|---|---|---|
| A | 280-340 | ≈230-240 | ≈25 mins | ≈170-200 |
| B | 293-340 | ≈230-240 | ≈25 mins | ≈170-200 |
| C | 284-338 | ≈229-241 | ≈25 mins | ≈170-200 |
| D | 286-335 | ≈219-243 | ≈25 mins | ≈170-200 |
| E | 280-350 | ≈220-240 | ≈25 mins | ≈170-200 |
| F | 275-344 | ≈215-245 | ≈25 mins | ≈170-200 |
| G | 275-329 | ≈218-242 | ≈25 mins | ≈170-200 |
| H | 339-370 | ≈208-238 | ≈25 mins | ≈170-200 |
| I | 337-373 | ≈220-250 | ≈25 mins | ≈170-200 |
| J | 340-360 | ≈220-250 | ≈25 mins | ≈170-200 |

NOTES:
≈approximately

TABLE 9

Properties of the water-insoluble products from processing slurry compositions (A, C-F)

| Run No. | Mixed Solid Substrate & Oil Product GCV (MJ/kg dry basis) | Separated oil Product GCV (MJ/kg dry basis) | Recovered Solid substrate/solid product GCV (MJ/kg dry basis) |
|---|---|---|---|
| A | 31.6 | 33.2 | 31.8 |
| C | 27.14 | 33.46 | 29.35 |
| D |  | 35.75 |  |
| Separated oil Product—GCV calculated from elemental analysis(MJ/kg dry basis) | | | |
| E |  | 36.09 |  |
| F |  | 37.26 |  |

TABLE 10

Properties of the water-insoluble products from processing slurry compositions (C-F)

| | Ultimate analysis of Separated Oil product dry basis | | | | | | Ultimate analysis of recovered substrate/solid product dry basis | | | | | |
|---|---|---|---|---|---|---|---|---|---|---|---|---|
| Run No. | % C | % H | % N | % Ash | % O | Molar H/C Ratio | % C | % H | % N | % Ash | % O | Molar H/C Ratio |
| C | 75.79 | 7.33 | 0.58 | 0.18 | 16.12 | 1.15 | 73.23 | 3.54 | 0.91 | 7.12 | 15.2 | 0.58 |
| D | 80.45 | 8.49 | 0.19 | 0.15 | 10.72 | 1.26 | | | | | | |
| E | 78.29 | 8.41 | 0.08 | 0.1 | 13.13 | 1.28 | | | | | | |
| F | 80.81 | 8.32 | 0.18 | | 10.7 | 1.23 | | | | | | |

Oxygen by difference % O = 100 − % C-% H-% N-% Ash

The invention claimed is:

1. A method of inhibiting a substantial pressure gradient in a continuous or a semi-continuous flow reactor for the production of a product mixture, comprising:
providing a reaction mixture comprising an organic matter feedstock and a solid substrate to the continuous or a semi-continuous flow reactor, the solid substrate thereby inhibiting a substantial pressure gradient of the reaction mixture while in the continuous or a semi-continuous flow reactor,
wherein the solid substrate constitutes between 5% and 15% of the total combined mass of the solid substrate and organic matter feedstock in the reaction mixture.

2. The method of claim 1 wherein the continuous or a semi-continuous flow reactor is a reactor vessel comprising reactor vessel walls and wherein inhibiting a substantial pressure gradient in the continuous or a semi-continuous flow reactor results from the solid substrate causing substantial avoidance of at least one of char and scale accumulation on the reactor vessel walls.

3. The method of claim 1 wherein the continuous or a semi-continuous flow reactor is a reactor vessel comprising reactor vessel walls, and avoidance of at least one of char and scale accumulation on the reactor vessel walls provides for the ability of separation of components of the product mixture, a component of the product mixture comprising organic matter feedstock that becomes charred in the continuous or a semi-continuous flow reactor.

4. The method of claim 3 wherein charred organic matter feedstock is a component of the product mixture and is separated from the product mixture by thermally treating the product mixture to generate the carbon-rich char.

5. The method of claim 4 wherein thermally treating the product mixture is in the substantial absence of oxygen.

6. The method of claim 3 wherein the method comprises producing a carbon-rich char from charred organic matter retrieved during the separation.

7. The method of claim 1 wherein the reaction mixture comprises a solvent.

8. A method for the production of a product mixture utilizing a continuous or a semi-continuous reactor vessel having reactor vessel walls, comprising:
providing a reaction mixture comprising organic matter feedstock and a solid substrate, the solid substrate thereby providing substantial avoidance of at least one of char and scale accumulation on the reactor vessel walls;
wherein the solid substrate comprises between 5% and 15% of the total combined mass of the solid substrate and organic matter feedstock.

9. The method of claim 8 wherein the reaction mixture comprises a solvent and the solid substrate sequesters at least one of organic and/or inorganic matter that de-solubilises within the reaction mixture while in the continuous or a semi-continuous flow reactor.

10. The method of claim 8 wherein charred organic matter is a component of the product mixture and is separated from the product mixture.

11. The method of claim 10 wherein charred organic matter is a component of the product mixture and is separated from the product mixture by thermally treating the product mixture to generate the carbon-rich char.

12. The method of claim 11 wherein thermally treating the product mixture is in the substantial absence of oxygen.

13. The method of claim 8 wherein substantial avoidance of at least one of char and scale accumulation on the reactor vessel walls inhibits a substantial pressure gradient in the continuous or a semi-continuous flow reactor.

14. The method of claim 10 wherein the method comprises producing a carbon-rich char from charred organic matter separated from the product mixture.

15. A method for producing a carbon-rich char from organic matter feedstock, the method comprising:
providing a reaction mixture comprising the organic matter feedstock and a solid substrate;
treating the reaction mixture in a reactor vessel at a reaction temperature and pressure suitable for conversion of all or a portion of the organic matter feedstock into a product mixture; and
depressurising and cooling the product mixture;
wherein the solid substrate is solid or substantially solid at the reaction temperature and pressure and sequesters organic and/or inorganic matter that de-solubilises within the reaction mixture or the product mixture;

thermally treating the product mixture to generate the carbon-rich char; and separating the carbon-rich char from the product mixture; wherein the solid substrate constitutes between 5% and 15% of the total combined mass of the solid substrate and organic matter feedstock in the reaction mixture.

16. The method of claim 15 wherein in the reactor vessel comprises reactor vessel walls and the solid substrate provides substantial avoidance of at least one of char and scale accumulation on the reactor vessel walls.

17. The method of claim 15 wherein the solid substrate inhibits formation of a substantial pressure gradient within the reaction vessel during conversion of all or a portion of the organic matter feedstock into a product mixture.

18. The method of claim 15 wherein the reaction mixture comprises a solvent.

19. The method of claim 15 wherein thermally treating the product mixture is in the substantial absence of oxygen.

* * * * *